(12) United States Patent
Jetzfellner

(10) Patent No.: US 11,412,047 B2
(45) Date of Patent: Aug. 9, 2022

(54) METHOD AND CONTROL SYSTEM FOR CONTROLLING AND/OR MONITORING DEVICES

(71) Applicant: Siemens Aktiengesellschaft, Munich (DE)

(72) Inventor: Thomas Jetzfellner, Aschheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/072,263

(22) Filed: Oct. 16, 2020

(65) Prior Publication Data

US 2021/0037100 A1 Feb. 4, 2021

Related U.S. Application Data

(63) Continuation of application No. PCT/EP2018/078900, filed on Oct. 22, 2018.

(30) Foreign Application Priority Data

Apr. 18, 2018 (EP) ..................... 18167966

(51) Int. Cl.
*H04L 67/125* (2022.01)
*H04L 9/06* (2006.01)
*H04L 67/1087* (2022.01)
*H04L 67/1097* (2022.01)

(52) U.S. Cl.
CPC .......... *H04L 67/125* (2013.01); *H04L 9/0618* (2013.01); *H04L 9/0643* (2013.01); *H04L 67/1091* (2013.01); *H04L 67/1097* (2013.01); *H04L 2209/38* (2013.01)

(58) Field of Classification Search
CPC ... H04L 67/125; H04L 9/0618; H04L 9/0643; H04L 67/1091; H04L 67/1097; H04L 2209/38; H04L 12/2816; G06F 16/9024
See application file for complete search history.

(56) References Cited

U.S. PATENT DOCUMENTS

| | | | |
|---|---|---|---|
| 8,457,944 B2 * | 6/2013 | Mangold | G06F 11/3457 703/21 |
| 11,144,893 B2 * | 10/2021 | Li | G06Q 20/389 |
| 2013/0054765 A1 | 2/2013 | Baret | |

(Continued)

FOREIGN PATENT DOCUMENTS

| | | |
|---|---|---|
| CN | 102882969 A | 1/2013 |
| CN | 104581073 A | 4/2015 |

(Continued)

OTHER PUBLICATIONS

Anderson, R. "Security Engineering: A guide to building dependable distributed systems." (2001), pp. 1-600.

(Continued)

*Primary Examiner* — Jonathan A Bui
(74) *Attorney, Agent, or Firm* — Lempia Summerfield Katz LLC

(57) ABSTRACT

The disclosure refers to management of complex control instruction chains in a blockchain for a specific task for controlling devices. In particular, the disclosure permits a prescribed validity to be assigned for a specific task of blockchain-based device control, wherein the validity is defined for example by the life cycle (e.g., the period of use) of a device.

11 Claims, 3 Drawing Sheets

(56) References Cited

U.S. PATENT DOCUMENTS

| | | | |
|---|---|---|---|
| 2013/0060741 A1 | 3/2013 | Zvibel | |
| 2014/0330889 A1 | 11/2014 | Brasche et al. | |
| 2016/0004628 A1* | 1/2016 | Gugri | G06F 11/3688 717/124 |
| 2019/0095647 A1 | 3/2019 | Merli | |
| 2019/0303623 A1* | 10/2019 | Reddy | G06F 11/3692 |
| 2020/0074422 A1* | 3/2020 | Hearn | G06Q 20/3825 |
| 2020/0351116 A1* | 11/2020 | Jetzfellner | G06F 16/1734 |

FOREIGN PATENT DOCUMENTS

| | | |
|---|---|---|
| CN | 105302661 A | 2/2016 |
| CN | 107077675 A | 8/2017 |
| DE | 102011018878 B3 | 9/2012 |
| DE | 102011081796 A1 | 2/2013 |
| DE | 102012214324 A1 | 3/2013 |
| DE | 102016205289 A1 | 10/2017 |
| WO | 2017145006 A1 | 8/2017 |

OTHER PUBLICATIONS

Andreas M. Antonopoulos, Gavin Wood, "Mastering Ethereum," https://github.com/ethereumbook/ethereumbook, Status: Oct. 24, 2017.

Antonopoulos, Andreas M. "Mastering Bitcoin: unlocking digital cryptocurrencies" O'Reilly Media, Inc., 2014. pp 1-282.

Baird Leemon: "Overview of Swirlds Hashgraph", Swirlds; 2016. pp. 1-4.

Baird, Leemon. "The swirlds hashgraph consensus algorithm: Fair, fast, byzantine fault tolerance." Swirlds, Inc. Technical Report SWIRLDS-TR-2016 1 (2016). pp. 1-28.

Blockchainhub: "Blockchain Oracles", https://blockchainhub.net/blockchain-oracles/; 2018. pp. 1-5.

Diedrich, Henning "Ethereum: Blockchains, Digital Assets, Smart Contracts, Decentralized Autonomous Organizations" CreateSpace Independent Publishing Platform, 8. Sep. 2016 // ISBN-10: 1523930470 // ISBN-13: 978-1523930470. Abstract.

E. Zio and N. Pedroni, "Reliability Estimation by Advanced Monte Carlo Simulation," Chapter 1 in: Simulation methods tor reliability and availability of complex systems, Springer Science & Business Media, 2010. pp. 1-39.

International Search Report and the Written Opinion for International Patent Application PCT/EP2018/078900 dated Jan. 22, 2019.

Needham, Roger M., and Michael D. Schroeder. "Using encryption for authentication in large networks of computers." Communications of the ACM 21.12 (1978): 993-999.

Chinese Office Action for Chinese Application No. 201880094760.X dated Sep. 18, 2021.

Zhu, Tao, et al. "Consistency and availability in distributed database systems." Journal of Software 29.1 (2018): 131-149 with abstract.

* cited by examiner

METHOD AND CONTROL SYSTEM FOR CONTROLLING AND/OR MONITORING DEVICES

The present patent document is a continuation of PCT Application Serial No. PCT/EP2018/078900, filed Oct. 22, 2018, designating the United States, which is hereby incorporated by reference, and this patent document also claims the benefit of European Patent Application No. 18167966.3, filed Apr. 18, 2018, which is also hereby incorporated by reference.

TECHNICAL FIELD

The disclosure relates to a method and control system for controlling and/or monitoring devices.

BACKGROUND

Devices, such as field devices and production devices, are being increasingly networked and may be provided/operated by different operators. Instruction sequences that may be executed by the devices may be conveyed to these devices. A disadvantage in this regard is that a performance of the instruction sequences is difficult to control in a heterogeneous network including devices from different operators.

SUMMARY AND DESCRIPTION

It is an object of the present disclosure to find an alternative to known solutions from the prior art. The scope of the present disclosure is defined solely by the appended claims and is not affected to any degree by the statements within this summary. The present embodiments may obviate one or more of the drawbacks or limitations in the related art.

The technology of blockchains or "distributed ledgers" is currently a hotly discussed technology that may be realized as a distributed database system. Besides applications for local payment systems (e.g. Bitcoin), new application technologies are being developed in the finance industry. In particular, transactions between firms may therefore be performed in a manner protected against manipulation without a mediator or clearing house. This allows new business models without a trusted mediator and reduces transaction costs, and new digital services may be provided flexibly without having to establish trust relationships and an infrastructure that has been set up specifically for the digital services. A transaction data record (or transaction, for short) protected by a blockchain includes e.g. program code, which may also be referred to as what is known as a "smart contract".

A control system for controlling and/or monitoring devices. The control system includes a distributed database system having: a multiplicity of nodes, wherein the nodes and the devices are connected to one another via a first communication network. The system further includes a first determining module, wherein the first determining module assigns execution requirements to control instructions, an executability of the control instructions by nodes of the distributed database system or by devices is ascertained based on the execution requirements, the execution requirements include device-specific requirements and/or presupposed control instructions. The first determining module includes a virtualization module, wherein the virtualization module includes virtual images of the applicable nodes or of the applicable devices, wherein the executability of the control instructions is ascertained by the virtual images. The system further includes a first memory module for storing the respective control instructions with the assigned execution requirements in control transactions, wherein the control transactions are stored in data blocks of the distributed database system; and wherein the control transactions are transmitted to the devices by the data blocks.

Unless indicated otherwise in the description below, the terms "perform", "calculate", "computer-aided", "compute", "discover", "generate", "configure", "reconstruct" and the like may relate to actions and/or processes and/or processing acts that alter and/or produce data and/or that convert data into other data, the data being able to be presented or available as physical variables, in particular, for example as electrical impulses. In particular, the expression "computer" may be interpreted as broadly as possible in order to cover in particular all electronic devices having data processing properties. Computers may therefore be for example personal computers, servers, programmable logic controllers (PLCs), handheld computer systems, pocket PC devices, mobile radios and other communication devices that may process data in computer-aided fashion, processors and other electronic devices for data processing.

Within the context of the disclosure, "computer-aided" may refer to an implementation of the method in which in particular a processor carries out at least one method act of the method.

A processor may refer to a machine or an electronic circuit. A processor may be in particular a central processing unit (CPU), a microprocessor or a microcontroller, for example an application-specific integrated circuit or a digital signal processor, possibly in combination with a memory unit for storing program instructions, etc. A processor may also be an IC (integrated circuit), in particular an FPGA (field programmable gate array) or an ASIC (application-specific integrated circuit), or a DSP (digital signal processor) or a graphics processor GPU (graphics processing unit). A processor may also refer to a virtualized processor, a virtual machine or a soft CPU. It may also be a programmable processor that is equipped with configuration acts for carrying out the method or that is configured by configuration acts such that the programmable processor realizes the features for the method, the components, the modules or other aspects and/or sub-aspects.

A "memory unit" or a "memory module" and the like may refer to a volatile memory in the form of random access memory (RAM) or a permanent memory such as a hard disk or a data carrier.

A "module" may refer to a processor and/or a memory unit for storing program instructions. By way of example, the processor is configured specifically to execute the program instructions such that the processor performs functions to implement or perform the method or an act of the method.

A module may also be a node of the distributed database system that for example performs/realizes the specific functions/features of an applicable module. The respective modules may also be in the form of separate or standalone modules. To this end, the applicable modules may include further elements. These elements are for example one or more interfaces (e.g. database interfaces, communication interfaces—e.g. network interface, WLAN interface) and/or an evaluation unit (e.g. a processor) and/or a memory unit. The interfaces may be used for example to interchange (e.g. receive, convey, send or provide) data. The evaluation unit may be used for example to compare, check, process, assign or calculate data in computer-aided and/or automated fashion. The memory unit may be used for example to store, retrieve or provide data in computer-aided and/or automated fashion.

"Comprise", in particular in regard to data and/or information, may refer to (computer-aided) storage of applicable information or of an applicable datum in a data structure/data record (which e.g. is in turn stored in a memory unit).

"Assign", in particular in regard to data and/or information, may refer to computer-aided assignment of data and/or information. By way of example, a second datum is assigned to a first datum in this regard by a memory address or a unique identifier (UID), e.g. by storing the first datum together with the memory address or the unique identifier of the second datum together in a data record.

"Provide", in particular in regard to data and/or information, may refer to computer-aided provision. Provision is effected for example via an interface (e.g. a database interface, a network interface, an interface to a memory unit). This interface may be used for example to convey and/or send and/or retrieve and/or receive applicable data and/or information during the provision.

"Provision" may refer to loading or storing, for example, of a transaction containing applicable data. This may be effected on or by a memory module. "Provision" may also refer to transmitting (or sending or conveying) of applicable data from one node to another node of the blockchain or of the distributed database system (or the infrastructure thereof).

A "checksum", for example a data block checksum, a data checksum, a node checksum, a transaction checksum, a concatenation checksum or the like, may refer to a cryptographic checksum or cryptographic hash or hash value, which are formed or calculated, in particular by a cryptographic hash function, for a data record and/or data and/or one or more of the transactions and/or a subregion of a data block (e.g. the block header of a block of a blockchain or data block header of a data block of the distributed database system or only some of the transactions of a data block). A checksum may be in particular a checksum/s or hash value/s of a hash tree (e.g. Merkle tree, Patricia tree). Furthermore, it may also refer to a digital signature or a cryptographic message authentication code. The checksums may be used to provide cryptographic protection/protection against manipulation for the transactions and the data stored therein on different levels of the database system. If for example a high level of security is called for, the checksums are produced and checked at transaction level, for example. If a lower level of security is called for, the checksums are produced and checked at block level (e.g. for the entire data block or for only some of the data block and/or some of the transactions), for example.

A "data block checksum" may refer to a checksum that for example is calculated for some or all transactions of a data block. A node may then, by way of example, check/discover the integrity/authenticity of the applicable part of a data block by the data block checksum. Additionally or alternatively, the data block checksum may in particular also have been formed for transactions of a preceding data block/predecessor data block of the data block. This data block checksum may in particular also be realized by a hash tree, for example a Merkle tree or a Patricia tree, wherein the data block checksum is in particular the root checksum of the Merkle tree or of a Patricia tree or of a binary hash tree. In particular, transactions are safeguarded by further checksums from the Merkle tree or Patricia tree (e.g. by using the transaction checksums), wherein in particular the further checksums are leaves in the Merkle tree or Patricia tree. The data block checksum may thus for example safeguard the transactions by virtue of the root checksum being formed from the further checksums. The data block checksum may be calculated for transactions of a specific data block of the data blocks. In particular, such a data block checksum may be adopted in a succeeding data block of the specific data block in order to concatenate this succeeding data block with its preceding data blocks, for example, and in particular thus to make an integrity of the distributed database system checkable. This allows the data block checksum for example to undertake the function of the concatenation checksum or to be adopted in the concatenation checksum. The header of a data block (e.g. of a new data block or of the data block for which the data block checksum has been formed) may include the data block checksum, for example.

A "transaction checksum" may refer to a checksum that is in particular formed for a transaction of a data block. Additionally, for example a calculation of a data block checksum for an applicable data block may be speeded up, because for example already calculated transaction checksums may immediately be used as leaves e.g. of a Merkle tree for this purpose.

A "concatenation checksum" may refer to a checksum that, in particular, indicates or references the preceding data block of the distributed database system for a respective data block of the distributed database system (in particular frequently referred to as "previous block hash" in specialist literature). This in particular involves an applicable concatenation checksum being formed for the applicable preceding data block. The concatenation checksum used may be a transaction checksum or the data block checksum of a data block (e.g., an existing data block of the distributed database system), in order to concatenate a new data block with an (e.g., existing) data block of the distributed database system. It is, by way of example, alternatively possible for a checksum to be formed for a header of the preceding data block or for all of the preceding data block and used as concatenation checksum. This may also be calculated for multiple or all preceding data blocks. It is, by way of example, also feasible for the concatenation checksum to be formed for the header of a data block and the data block checksum. However, a respective data block of the distributed database system may include a respective concatenation checksum that was calculated for or relates to a preceding data block, (e.g., the directly preceding data block), of the respective data block. It is, by way of example, also possible for an applicable concatenation checksum to be also formed only for a portion of the applicable data block (e.g. preceding data block). This allows for example a data block to be produced that includes an integrity-protected portion and an unprotected portion. This would allow for example a data block to be produced whose integrity-protected portion is invariable and whose unprotected portion may also still be altered later. Integrity-protected is intended to be understood here to mean in particular that an alteration of integrity-protected data is discoverable by a checksum.

The data stored in a transaction of a data block, for example, may be provided in different ways. Instead of the data, e.g. user data such as measurement data or data/ownership relationships pertaining to assets, a transaction of a data block may include only the checksum for these data, for example. The applicable checksum may be produced in various ways. This may be an applicable data block checksum of a data block (e.g., containing the applicable data) of another database or of the distributed database system, a transaction checksum of a data block containing the applicable data (e.g., of the distributed database system or of another database) or a data checksum that was formed using the data.

Additionally, the applicable transaction may also include a reference to or an indication of a memory location (e.g. an address of a file server and details as to where the applicable data may be found on the file server; or an address of another distributed database that includes the data). The applicable data may then, by way of example, also be provided in another transaction of a further data block of the distributed database system (e.g. if the applicable data and the associated checksums are contained in different data blocks). It is, by way of example, alternatively conceivable for these data to be provided via another communication channel (e.g. via another database and/or a cryptographically secured communication channel).

It is also possible, by way of example, for, in addition to the checksum, an additional data record (e.g. a reference to or an indication of a memory location) to be stored in the applicable transaction, in particular indicating a memory location from which the data may be retrieved. This is in particular advantageous for keeping a data size of the blockchain or distributed database system as small as possible.

"Security-protected" may refer to protection provided in particular by a cryptographic method. By way of example, this may be brought about by using the distributed database system to provide or transmit or send applicable data/transactions. This may be achieved by combining the various (e.g., cryptographic) checksums, because these interact in particular in synergistic fashion in order for example to improve the security or cryptographic security for the data of the transactions. In other words, "security-protected" may also refer to "cryptographically protected" and/or "protected against manipulation", "protected against manipulation" also being able to be referred to as "integrity-protected".

"Concatenation of (the) data blocks of a distributed database system" may refer to that data blocks each include information (e.g. concatenation checksum) referring to or referencing another data block or multiple other data blocks of the distributed database system.

"Insertion into the distributed database system" and the like may refer to that, in particular, a transaction or the transactions or a data block with its transactions is conveyed to one or more nodes of a distributed database system. If these transactions are for example validated successfully (e.g. by the node/s), these transactions are in particular concatenated as a new data block with at least one existing data block of the distributed database system. For this purpose, the applicable transactions are stored for example in a new data block. In particular, this validation and/or concatenation may be performed by a trusted node (e.g. a mining node, a blockchain oracle or a blockchain platform). In particular, a blockchain platform may be understood to mean a blockchain as a service, as proposed in particular by Microsoft or IBM. In particular, a trusted node and/or a node may each store a node checksum (e.g. a digital signature) in a data block (e.g. in the data block validated and generated thereby, which is then concatenated), in order in particular to make it possible to identify the originator of the data block and/or to make it possible to identify the node. In this case, this node checksum indicates which node has for example concatenated the applicable data block with at least one other data block of the distributed database system.

"Transaction" or "transactions" may refer to a smart contract, a data structure or a transaction data record that, in particular, each include one of the transactions or multiple transactions. "Transaction" or "transactions" may also refer to the data of a transaction of a data block of a blockchain. A transaction may in particular include a program code that provides a smart contract, for example. By way of example, a transaction may also refer to a control transaction and/or confirmation transaction. A confirmation transaction is able, for example after successful execution of control transactions, to be stored by a device in the distributed database system (e.g. the device stores the confirmation transaction in the distributed database system). A confirmation transaction may include a confirmation of an execution of the control instructions of the control transaction by one of the devices if an applicable device from the devices has successfully executed the control instructions of the control transaction. To this end, the confirmation transaction may include a checksum produced by the applicable device (e.g. a transaction checksum) for the executed control instructions and/or a confirmation of the execution, which is e.g. likewise protected by the checksum. A confirmation transaction may also be stored in the distributed database system if the device partially executes the control instructions and/or the execution of the control instructions is interrupted. This may be the case e.g. if a fault has occurred on the device during the execution of the control instructions that no longer permits the execution of the control instructions (e.g. a fault occurred on an actuator or tool). By way of example, another device, for example meeting the execution requirements for the remaining unexecuted control instructions, may then use the confirmation transaction to execute these unexecuted control instructions of the applicable control transaction. Accordingly, the confirmation transaction may include the degree of execution or an indication about the executed portion of the control instructions. Alternatively or additionally, a confirmation transaction may indicate the control instructions that still need to be executed for a successful execution of the control instructions of an applicable control transaction. Accordingly, for example a confirmation transaction may include a data record indicating which of the control instructions still need to be executed and indicating which of the control instructions are missing for the successful execution of the control instructions of an applicable control transaction. This allows for example a further processing of the control instructions to take place even if the execution of the control instructions on a device was interrupted. Accordingly, for example the execution requirements may call for more than one device (e.g. two or three devices or more devices) to meet the execution requirements so that an execution of the control instructions is guaranteed even if e.g. a device fails during the execution of the control instructions of an applicable control transaction.

Alternatively, a transaction may be a data structure that stores data (e.g. the control instructions). A transaction may also be referred to as a message (e.g., a communication message storing data) or may be a message that e.g. stores applicable data (e.g. control instructions). The disclosure therefore allows applicable transactions or messages to be interchanged. Transactions may include the control instructions and/or contractual data and/or other data such as video data, user data, measurement data, etc.

"Control instructions" or "control transactions" may refer to a smart contract or executable program code that is in particular executed by the distributed database system, wherein for example the distributed database system or nodes and infrastructure thereof performs or implements the applicable control instructions. In particular, the control instructions may be used to control the devices/nodes. In particular, the control instructions or the control instructions of the/a control transaction may or are supposed to be used to control/actuate the devices and/or the nodes. In particular, multiple control instructions or control transactions including one or more data blocks yield an instruction sequence that may control in particular a production installation with the associated production machines, may control the devices of an automation network or may control the devices of a power supply system or may control devices on the Internet of Things. In particular, the production instructions or production acts for a product are encoded in the control instructions or control transactions (e.g., also in the instruction sequences). The devices (e.g. the applicable device) are for example devices of a technical system and/or industrial installation and/or of an automation network and/or of a production installation and/or devices on the Internet of Things that are in particular also a node of the distributed database system. The devices in this case may be field devices that are in particular also a node of the distributed database system. The devices may also be automated teller machines, wherein the control instructions prompt a cash payment. By way of example, the control instructions may be derived from or determined from an instruction sequence. By way of example, a control transaction may include one or more control instructions. By way of example, the control instructions encode mechanical movement and/or other physical variables (e.g. pressure or temperature) that are converted into the applicable mechanical movement and/or the applicable other physical variables by an applicable device/node (e.g. by an applicable actuator). The control instructions are then used to control actuators of the devices and/or nodes, for example. Accordingly, an applicable device/node includes an actuator, for example. If a device/node is a robot, for example, then an actuator would also be referred to as an effector. A device may also be a mechatronic device or system, for example, a mechatronic device/system being an actuator and/or a linear motion device, for example. A linear motion device is a device for carrying out translative movements, for example. An applicable device may also be a drive system, for example. The control instructions and the devices and/or nodes may also be used to adjust and/or control a control loop, for example by virtue of the confirmation transactions for executed control instructions being evaluated by the control system and applicable control instructions being produced in response to the confirmation transactions. For these new control instructions, applicable execution requirements are then determined again, for example, and these are then stored in control transactions again, for example, so that the control transactions may, as disclosed herein, be executed by the applicable devices, for example. The control instructions may also be control instructions for controlling cryptographic devices and/or methods (e.g. a user authentication).

Control instructions may also refer to instruction sequences or else transactions from a database or a database system that are supposed to be executed by devices or nodes of the distributed database system. The database system may be the distributed database system, for example, if there are e.g. transactions to which execution requirements were not yet allocated or assigned. Alternatively or additionally, the database system may be another database, e.g. a conventional hierarchic database, from which the applicable transactions may be retrieved. Control instructions may also refer to instruction sequences or else transactions that are provided by an input system and that are supposed to be executed by the distributed database system. Control instructions may refer to instruction sequences or control instructions that are used to control mechanical and/or electrical and/or electromechanical and/or electronic devices.

"Device-specific requirements" may refer to a specific device that is e.g. stipulated by a unique identifier, devices that may perform prescribed control actions (e.g. a production robot that may weld metal parts; a painting robot that may apply prescribed paints to a manufactured part; devices that make electrical connections in a substation in automated fashion) or devices that perform production acts or control instructions with a prescribed precision and/or at a prescribed speed (e.g. lathes, milling cutters and cutting machines). Alternatively or additionally, "device-specific requirements" may also presuppose specific device classes that are prescribed for an execution or performance of the control instructions. In particular, a device class is understood to mean one or more devices (e.g. grinding devices or sawing devices) that are capable of executing specific prescribed actions (e.g. grinding or sawing a specific material), for example. In particular, the device-specific requirements are the requirements imposed on the applicable devices and/or nodes for executing the control instructions. The device-specific data or device properties then correspond for example to the actual and/or current device-specific data or device properties of a device. By way of example, checking is performed to ascertain whether a device or a production machine is capable of executing the control instructions with the prescribed precision that is e.g. prescribed in the device-specific requirements. In particular, device-specific requirements may also be referred to as machine and/or mechatronic and/or production-specific requirements. In particular, device-specific data or device properties may also be referred to as machine and/or mechatronic and/or production-specific data or device properties. In particular, device-specific data or device properties may also be referred to as device information. In particular, the device-specific requirements prescribe the requirements that are supposed to be met by the device-specific data of a device. In other words, the device-specific requirements prescribe a "setpoint" value that is compared against the "actual" value from the devices. The device-specific data are in particular the current device properties. These device properties/device-specific data include for example the UID of a device or system, available tools or supported production processes (milling, grinding or 3D printing), production precision, production costs, site of the devices, network address for addressing/actuating the device, authorized users, etc.

The device-specific requirements may also be security requirements or location-related requirements (e.g. a country statement, a GPS statement or zip code (PLZ)) that a device is supposed to meet for executing the control instructions. By way of example, one requirement may be that the device is supposed to have prescribed security devices or that execution of the control instructions on the device also requires specific/prescribed authentication. This may be the case for example if someone wishes to use a device (e.g. an automated teller machine) to withdraw cash. The control instructions are then, by way of example, the request by the customer to make a cash payment. If, for example, an applicable customer has specified that the customer permits a cash payment only in prescribed countries, (e.g. Italy, France and Austria), then this is stored in the device-specific requirements (and in particular possibly implicitly in the execution requirements as well). An automated teller machine in Andorra might then not permit a payment or prevent a payment. Alternatively, this may also be prevented by another node of the distributed database system or prevented by a smart contract of the distributed database system. It is also possible, by way of example, for the security requirements to call for specific authentication of the customer. By way of example, for a pin to be entered for a payment (which is not necessarily the case e.g. in the USA) and/or for a specific pin length to be required (e.g. 8 characters) and/or for other additional authentication methods to be required (e.g. 2-factor authentication, mobile TAN, Google Authenticator).

Alternatively, the determining module may also analyze the control instructions further and, if for example the determining module already discovers that the device-specific requirements are not met or are not meetable, may create a control transaction that indicates this to the applicable device or the system and if need be prevents an execution of the control instructions. Alternatively, it is, by way of example, also possible for no control transaction to be produced, and at some point there is a timeout for the execution of the control instructions, e.g. after a prescribed period, which may be configurable.

"System-specific data" or "device-specific data" may also refer to system properties or device properties of a device or technical system. The device-specific data or system-specific data are for example current device properties or system properties. The device-specific data or system-specific data (or the applicable properties) may include the following data for a technical system, the devices of a technical system or a device: the UID of the device or system, available tools or supported production processes (milling, grinding or 3D printing) of the device or system, production precision of the device or system, production costs of the device or system, site of the device or system, network address for addressing/actuating the device or system, authorized users for the device or system, name of the device or system, etc.

Depending on the chosen implementation, for example the system-specific data may be realized for one or more devices of a technical system generally, e.g. by virtue of a UID/(network) address of the technical system also being able to be used to address, identify or communicate with the applicable devices of the technical system. Alternatively or additionally, for example the device-specific data for one device or the multiple devices of the technical system may be included in the system-specific data.

A "technical system" may refer to a device or multiple devices that are communicatively connected to one another and/or to a distributed database system (e.g. the first distributed database system).

"Presupposed control instructions" may refer to control instructions that, in particular, need to be executed by other nodes (of the distributed database system) and/or by one or more of the devices already before the applicable control instructions may be executed. In particular, applicable confirmation transactions for these previously executed control instructions are stored in the distributed database system (e.g. in data blocks of the distributed database system) if e.g. the previously executed control instructions were successfully executed by devices or nodes. In particular, these previously executed or presupposed control instructions also result in the device-specific requirements assigned to these previously executed control instructions being checked as well or taken into consideration as well. The execution requirements may be used to provide that an order of the production acts is observed for creating a product. This achieves the effect for example that the order of production is observed in a meaningful way. For example, one production act is prevented from being destroyed by another just because the order of production has not been observed. Similarly, it is in particular also possible for a controller of a power supply system to be controlled by virtue of e.g. transformers or voltage couplers being switched on or connected to the power supply system in the correct order. If for example the execution of control instructions or control transactions requires no presupposed control instructions, the presupposed control instructions may be blank. By way of example, they may be filled with a zero, filled with a blank string or with a value indicating that no presupposed control instructions are needed. Alternatively, for example, some of the control instructions may have no assigned execution requirement, in particular at least one of the control instructions having at least one assigned execution requirement. By way of example, the presupposed control instructions are control instructions that have been converted e.g. by a device and/or node into a prescribed mechanical movement and/or other physical variables (e.g. pressure or temperature), or are supposed to be converted (e.g. for preparation of a workpiece) before the performance of the control instructions. The presupposed control instructions (provided that they were executed successfully) were then used for example to actuate the actuators of the devices and/or nodes such that a workpiece was put into the state or production state that e.g. a further processing is possible or is made possible after the execution of the presupposed control instructions. Accordingly, the applicable devices/nodes may then be actuated with the control instructions of the control transaction such that the further processing takes place (if e.g. the presupposed control instructions were executed and in particular confirmation transactions are available for them). The presupposed control instructions and the devices and/or nodes may also be used to adjust and/or control a control loop by virtue of for example the confirmation transactions for executed/presupposed control instructions being evaluated by the control system and applicable control instructions being produced in response to the confirmation transactions. The presupposed control instructions may also be control instructions that were used to actuate a cryptographic device and/or method (e.g. a user authentication). Alternatively or additionally, the presupposed control instructions may prescribe a capture of specific measured variables (e.g. by a sensor). By way of example, it is thus prescribed that applicable transactions with applicable measured values are supposed to observe prescribed measured value ranges or threshold values. The measured values may be a value of a measured variable (e.g. 30° C.) and/or date/time of the capture and/or location of the capture and/or sensor type and/or further information about the sensor (e.g. measurement accuracy).

In particular, "storage of transactions in data blocks" and the like may refer to direct storage or indirect storage. Direct storage may refer to that the applicable data block (of the distributed database system) or the applicable transaction (of the distributed database system) includes the respective data. Indirect storage may refer to that the applicable data block or the applicable transaction includes a checksum and optionally an additional data record (e.g. a reference or indication to a memory location) for applicable data, and the applicable data are therefore not stored in the data block (or the transaction) directly (e.g., only a checksum for these data instead). In particular, the storage of transactions in data blocks may result in these checksums being validated, for example, as explained under "insertion into the distributed database system", for example.

A "program code" (e.g. a smart contract) may refer to a program instruction or multiple program instructions, in particular stored in one or more transactions. The program code is in particular executable and is executed by the distributed database system, for example. This may be realized by an execution environment (e.g. a virtual machine), for example, the execution environment or the program code, e.g., being Turing complete. The program code may be executed by the infrastructure of the distributed database system. This may involve a virtual machine being realized by the infrastructure of the distributed database system.

A "separate and/or direct communication channel" may refer to a data transmission (e.g. a sending, a receiving, a transmitting, a providing or a conveying) by a communication channel as realized for example by the lightning network initially just for the transmission of cryptocurrency. By way of example, this channel may be used to send transactions/messages more quickly and to store a confirmation of this data interchange in the distributed database system. This allows for example important and/or time-critical control instructions or control transactions to be transmitted to an applicable device at higher speed and, in the process, e.g. the slower data transmission of the distributed database system (e.g. when replicating the data blocks/transactions) to be avoided. By way of example, a separate and/or direct communication channel may be set up for the disclosure and the cited aspects, exemplary embodiments, embodiments and their variants for a data transmission between a device (and/or node). By way of example, a direct communication channel results in the transactions/messages being interchanged between a sender (e.g. the (first) memory module and/or the (first) determining module) and a receiver (e.g. the device that is supposed to execute the control instructions) directly without further nodes and/or devices of the distributed database system being involved in this data interchange. By contrast, a separate communication channel may result in nodes and/or devices of the distributed database system being involved in the data interchange. If the separate and/or direct communication channel was set up between the sender and the receiver successfully (e.g., a communication connection was established thereby), then data for example in the form of transactions or messages may be interchanged between the sender and the receiver. By way of example, the necessary data for ascertaining the executability and/or the control transactions may be interchanged between the sender and/or the receiver. If for example the communication channel is closed/terminated (e.g., a communication connection is terminated), then, by way of example, a result of the data transmission e.g. in the form of transactions (e.g. as a transmission confirmation transaction) is stored in the distributed database system (e.g. in data blocks of the distributed database system). The result of the data transmission may be a confirmation of the transmission or reception of the applicable transactions/messages and/or an analysis result and/or the last transmitted transaction/message that was transmitted via the separate and/or direct communication channel before the communication channel was closed. The transaction may be stored with the result by the sender and/or receiver, for example. The analysis result may be the confirmation of the executability of the control instructions by a device, wherein for example an applicable device has confirmed that it may execute the control instructions. This may in turn be stored in a transaction (e.g. in an executability confirmation transaction) and e.g. stored in the execution requirements (e.g. in the device-specific requirements). Alternatively or additionally, the executability confirmation transaction is stored in the distributed database system. The executability confirmation transaction includes for example a unique identifier for the device that is capable of executing the control instructions or meets the applicable execution requirements. Alternatively or additionally, the executability confirmation transaction includes for example data about the execution, e.g. how well or to what degree the execution requirements are met (e.g. how quickly the control instructions are performed, when they are reliably performed, how accurately or precisely the control instructions are executed—for example when executing production control instructions). Alternatively or additionally, the executability confirmation transaction includes for example device-specific data of the applicable device that are relevant to the execution of the control instructions, e.g. the device-specific data having been ascertained by the applicable device at the time of confirmation of the executability by the device. For example, the confirmation of the executability and the ascertainment of the device-specific data take place (approximately) at the same time—for example within a time window of a few seconds or minutes. By way of example, the data of the executability confirmation transaction may also have been interchanged between the sender and the receiver before the executability confirmation transaction is stored e.g. in the distributed database system. The executability confirmation transaction may also be cryptographically protected (e.g. it may be encrypted or may be protected by a transaction checksum). It is also possible, by way of example, for the control transactions to be transmitted in an analogous manner to the applicable device that is supposed or able to execute the control instructions. To this end, for example a further separate and/or direct communication channel may be set up between the sender and the receiver. Alternatively, the aforementioned communication channel may continue to be used, for example. The applicable communication channel is then used for example to transmit the applicable control transactions to the applicable device. If for example the communication channel is closed/terminated again when the transmission has been (successfully) completed, the result of the transmission is e.g. stored as a transmission confirmation transaction in the distributed database system. It is also possible, by way of example, for the message most recently interchanged via the communication channel to be stored in the transmission confirmation transaction (e.g. if the communication channel is interrupted) and for the transmission confirmation transaction e.g. then to be stored in the distributed database system. This most recently interchanged message may be used for example to continue the data interchange or the data transmission when the communication channel is set up again. The transmission confirmation transaction may also be cryptographically protected. The transmission confirmation transaction may include the control instructions and/or the control transaction and/or the last interchanged message between the sender and the receiver. A continuation of the data interchange or of the data transmission may also be used for other data transmissions and is not restricted specifically to the data transmission or the data interchange of control transactions.

The separate and/or direct communication channel is advantageous for improving a transmission speed and/or transmission latency. By way of example, a hybrid method is also possible, for example by virtue of an applicable communication channel being used for time-critical control instructions (e.g. having high priority). By way of example, the execution requirements (e.g. time-critical control instructions or control instructions for a real-time application) may be used to determine whether applicable control instructions that are supposed to be transmitted via an applicable separate communication channel are involved. Alternatively or additionally, the (first) determining module may determine applicable transmission requirements for a data transmission of the control transactions when determining the execution requirements, for example. The transmission requirements may be stored in the execution requirements. The transmission requirements may then, by way of example, be used by the memory module to ascertain whether the control transactions for a transmission to the applicable device are stored in the distributed database system or whether the separate and/or direct communication channel is used for a data transmission to the applicable device. The data transmission may then, by way of example, be performed by the (first) memory module, which, to this end, e.g. includes an applicable communication module (e.g. a network interface).

A "smart contract" may refer to an executable program code (see, e.g., the "program code" definition described herein). The smart contract may be stored in a transaction of a distributed database system (e.g. a blockchain), for example in a data block of the distributed database system. By way of example, the smart contract may be executed in the same way as explained in the definition of "program code", in particular within the context of the disclosure.

"Smart contract process" may be understood to mean in particular an execution of a program code (e.g. of the control instructions or of a smart contract) in a process by the distributed database system or the infrastructure thereof.

"Proof-of-work evidence" may refer to solving a computationally intensive problem that, in particular, needs to be solved based on the data block content/content of a specific transaction. A computationally intensive problem of this kind is, by way of example, also referred to as a cryptographic puzzle.

A "distributed database system", which, by way of example, may also be referred to as a distributed database, may refer to a locally distributed database, a blockchain, a distributed ledger, a distributed memory system, a distributed ledger technology (DLT) based system (DLTS), a revision-proof database system, a cloud, a cloud service, a blockchain in a cloud or a peer-to-peer database. It is also possible, by way of example, for different implementations of a blockchain or DLTS to be used, such as e.g. a blockchain or DLTS that is implemented by a directed acyclic graph (DAG), a cryptographic puzzle, a hash graph or a combination of the implementation variants. It is also possible, by way of example, for different consensus methods (consensus algorithms) to be implemented. These may be a consensus method by a cryptographic puzzle, gossip about gossip, virtual voting or a combination of the methods (e.g. gossip about gossip in combination with virtual voting). If a blockchain is used, for example, then it may be implemented in particular by a Bitcoin-based implementation or an Ethereum-based implementation. A "distributed database system" may also refer to a distributed database system that has at least some of its nodes and/or devices and/or infrastructure implemented by a cloud. By way of example, the applicable components are implemented as nodes/devices in the cloud (e.g. as virtual nodes in a virtual machine). This may be accomplished by VM-ware, Amazon Web Services or Microsoft Azure, for example. On account of the high flexibility of the implementation variants explained, it is, in particular, also possible for sub aspects of the implementation variants to be combined with one another, e.g. by using a hash graph as a blockchain, the blockchain itself e.g. also being able to be blockless.

If for example a directed acyclic graph (DAG) is used (e.g. IOTA or Tangle), then in particular transactions or blocks or nodes of the graph are connected to one another via directed edges. This means, in particular, that (e.g., all) edges (e.g., always) have the same direction, similarly to in the case of e.g. time. In other words, it is in particular not possible to run or jump backwards (e.g., counter to the same common direction) through the transactions or the blocks or the nodes of the graph. Acyclic, in this instance, means in particular that there are no loops when running through the graph.

The distributed database system may be a public distributed database system (e.g. a public blockchain) or a closed (or private) distributed database system (e.g. a private blockchain), for example.

If it is a public distributed database system, for example, this means that new nodes and/or devices are able to join or be accepted by the distributed database system without proof of authorization or without authentication or without registration information or without credentials. In particular, the operators of the nodes and/or devices may remain anonymous in such a case.

If the distributed database system is a closed distributed database system, for example, then new nodes and/or devices require valid proof of authorization and/or valid authentication information and/or valid credentials and/or valid registration information, for example, in order to be able to join or be accepted by the distributed database system.

A distributed database system may also be a distributed communication system for data interchange or a peer-2-peer communication system or a peer-2-peer application, for example. This may be a network or a peer-2-peer network, for example.

A/the distributed database system may also be a local distributed database system and/or a local distributed communication system, for example.

"Data block", which, in particular depending on context and implementation, (also referred to as "link" or "block"), may be understood to mean a data block of a distributed database system (e.g., a blockchain or a peer-to-peer database) that is, in particular, implemented as a data structure and, in each case, may include one of the transactions or several of the transactions. In one implementation, the database (or the database system) may be a DLT based system (DLTS) or a blockchain and a data block may be a block of the blockchain or of the DLTS, for example. A data block may include details pertaining to the size (data size in bytes) of the data block, a data block header (block header), a transaction counter, and one or more transactions. The data block header may include a version, a concatenation checksum, a data block checksum, a timestamp, proof-of-work evidence, and a nonce (e.g., one-time value, random value or counter used for the proof-of-work evidence). A data block may also be just a specific memory area or address area for the total data stored in the distributed database system. It is thus possible, by way of example, for blockless distributed database systems, such as e.g. the IoT chain (ITC), IOTA and Byteball, to be implemented. These involve in particular the functionalities of the blocks of a blockchain and of the transactions being combined with one another such that e.g. the transactions themselves protect the sequence or chain of transactions (of the distributed database system) (e.g., store them in security-protected fashion). To this end, a concatenation checksum may be used to concatenate the transactions themselves with one another by virtue of, e.g., a separate checksum or the transaction checksum of one or more transactions being used as concatenation checksum, which is stored in the applicable new transaction as well when a new transaction is stored in the distributed database system. In such an embodiment, a data block may also include one or more transactions, for example, one transaction corresponding to one data block in the simplest case, for example.

"Nonce" may refer to a cryptographic nonce (abbreviation for "used only once" or "number used once"). In particular, a nonce denotes individual combinations of numbers or a combination of letters that may be used just once in the respective context (e.g. transaction, data transmission).

"Preceding data blocks of a (specific) data block of the distributed database system" may refer to the data block of the distributed database system that in particular directly precedes a (specific) data block. Alternatively, "preceding data blocks of a (specific) data block of the distributed database system" may also refer to all data blocks of the distributed database system that precede the specific data block. As a result, the concatenation checksum or the transaction checksum may be formed only from the data block (or the transactions thereof) directly preceding the specific data block or from all data blocks (or the transactions thereof) preceding the first data block, for example.

A "blockchain node", "node", "node of a distributed database system" and the like may refer to devices (e.g. field devices), computers, smartphones, clients or subscribers that perform operations for (with) the distributed database system (e.g. a blockchain). Such nodes may execute transactions of a distributed database system or the data blocks thereof or insert or concatenate new data blocks with new transactions into the distributed database system by new data blocks. In particular, this validation and/or concatenation may be performed by a trusted node (e.g. a mining node) or solely by trusted nodes. A trusted node is, by way of example, a node that has additional security measures (e.g. firewalls, access restrictions to the node or the like) in order to prevent manipulation of the node. Alternatively or additionally, a trusted node may store a node checksum (e.g. a digital signature or a certificate) in a new data block when the new data block is concatenated with the distributed database system, for example. It is thus, in particular, possible to provide proof indicating that the applicable data block was inserted by a specific node or indicating its origin. The devices (e.g. the applicable device) are for example devices of a technical system and/or industrial installation and/or of an automation network and/or of a production installation that are in particular also a node of the distributed database system. The devices in this instance may be field devices or devices in the Internet of Things that are in particular also a node of the distributed database system. Nodes may also include at least one processor, e.g. in order to perform their computer-implemented functionality.

A "blockchain oracle" and the like may refer to nodes, devices or computers that have a security module that includes for example software protection mechanisms (e.g. cryptographic methods), mechanical protection devices (e.g. a lockable housing) or electrical protection devices (e.g. tamper proofing or a protection system that erases the data of the security module in the event of inadmissible use/ handling of the blockchain oracle). The security module may include cryptographic keys, for example, which are necessary for calculating the checksums (e.g. transaction checksums or node checksums).

A "computer" may refer to a computer (system), a client, a smartphone, a device or a server that are in each case arranged outside the blockchain or are not subscribers to the distributed database system (e.g. the blockchain) (e.g., do not perform operations with the distributed database system, or only query it, without, however, performing transactions, do not insert data blocks or calculate proof-of-work evidence). Alternatively, a computer may also refer to a node of the distributed database system. In other words, a device may also refer to a node of the distributed database system or else a device outside the blockchain or the distributed database system. A device outside the distributed database system may access the data (e.g. transactions or control transactions) of the distributed database system and/or be actuated by nodes (e.g. by smart contracts and/or blockchain oracles), for example. If for example actuation or control of a device (e.g. a device in the form of a node or a device outside the distributed database system) is performed by a node, this may be accomplished e.g. by a smart contract that is, in particular, stored in a transaction of the distributed database system. A device or node may include an actuator, for example. A device or node may also be a mechatronic device or system, for example, a mechatronic device/system being an actuator and/or a linear motion device, for example. A linear motion device is a device for carrying out translative movements, for example. An applicable device may also be a drive system, for example. A device or node may be a cryptographic device/node (e.g. for performing user authentication), for example.

The disclosure allows, in particular, a local infrastructure for executing control instructions to be implemented. In particular, this allows control of the devices in the Internet of Things to be performed locally, even if individual operators of devices and/or device groups of the devices do not trust one another. In particular, the devices may be in the form of nodes of the distributed database system, and it is possible, by way of example, to find for executing or performing the control instructions dynamically by the distributed database system or an applicable node or an applicable device that meets the demanded execution requirements for executing the control instructions. Giving illegal preference to a node (e.g. as a result of fraud/bribery) may be severely hampered if for example a blockchain-based implementation of the distributed database system is used, because protection of confidence or protection against manipulation analogously to Bitcoin is implemented for the control transactions or confirmation transactions. In particular, it is possible to dispense with a central entity performing authentication of the nodes. If, by way of example, the database system is realized by a blockchain that, in particular, implements a cryptographic currency such as Bitcoin, then a customer that has set the control instructions or that has provided an instruction sequence (from which e.g. the control instructions are derived) may be billed for an execution of the control instructions in a simple and efficient manner, for example.

Additionally, security when operating the distributed database system (e.g. a blockchain) may be increased, for example, because an additional check was introduced for the execution of the control instructions, in particular. In other words, in particular unchecked transactions or control instructions are converted into checked transactions, the check being performed based on node or device properties of devices or nodes (e.g. the device-specific data) that are supposed to execute the control instructions, for example.

It is also conceivable, by way of example, for the method to be used to improve, or increase the security of, the payment of cash at automated teller machines if the automated teller machine is a node of the distributed database system or uses a node of the distributed database system or another interface to access or retrieve the applicable control transactions of the distributed database system, for example.

In particular determining the dependencies of the control instructions or instruction sequence during the execution thereof by the devices or nodes may be difficult in a complex control system having a very large number of nodes or devices (e.g. 200-1000 devices/nodes). The virtualization module may be used to improve in particular the determination of the executability and the dependencies of control instructions on one another, because e.g. the performance of the control instructions and/or the allowance for the execution requirements and/or the dependencies between control instructions may be simulated or checked by the virtual images. This also allows in particular an optimization of the control instructions to be improved and also allows an accuracy of a statement about whether the control instructions are executable to be improved, for example.

For this purpose the determining module may first ascertain the relevant devices and/or nodes for the execution of the control instructions and may instantiate the devices and/or nodes in or by the virtualization module as virtual images of the applicable nodes or the applicable devices. Instantiated virtual images of the applicable nodes and/or of the applicable devices then have the control instructions conveyed to them for execution.

The virtual images perform the control instructions, and the virtualization module captures execution parameters in the process. These are e.g. execution time, energy consumption and material consumption.

Based on these execution parameters, the determining module may then e.g. establish whether or not the execution requirements are met. Alternatively or additionally, the applicable execution requirements may also be determined in this manner. Alternatively or additionally, these execution parameters may also be used to optimize the control instructions and/or execution requirements.

The determining module may be implemented with different complexity, in particular. By way of example, the execution requirements may be prescribed by a central policy, or the execution requirements are determined by the determining module and then assigned to the control instructions. When the execution requirements have been prescribed, the determining module may be in a form such that the respective control instructions are assigned the applicable execution requirements necessary for the execution thereof by the devices.

By way of example, the transactions may, depending on implementation, either be stored directly in the data blocks of the distributed database system or be stored directly in the distributed database system.

In a first embodiment of the control system, the presupposed control instructions are already executed control instructions for which a confirmation of the execution thereof is stored in confirmation transactions of the data blocks of the distributed database system. Alternatively, the presupposed control instructions are already executed control instructions for which a confirmation of the execution thereof is stored in confirmation transactions of the distributed database system.

The control system is advantageous for, in particular, prescribing an order for the execution or processing of the control instructions by the applicable device by the presupposed control instructions. In particular, the presupposed control instructions may be control instructions of the same instruction sequence that, in particular, need to be executed at a time before the control instructions that (currently) need to be executed by the applicable device. The presupposed control instructions in this instance were in particular likewise stored in control transactions that are in turn stored in data blocks (e.g., one data block or multiple data blocks) of the distributed database system.

In further embodiments of the control system, the execution requirements prescribe a performance of the presupposed control instructions before further control instructions are performed.

The control system is advantageous for, in particular, providing that the execution or performance of the control instructions by the applicable device results in a product being produced in acts, for example. This is, in particular, advantageous if it is supposed to be provided that prescribed or selected control instructions or production acts are carried out by a prescribed or selected device.

In further embodiments of the control system, the execution requirements prescribe an order of a performance of the control instructions of a data block or of various data blocks. Alternatively, the execution requirements prescribe an order of a performance of the control instructions.

The control system is advantageous for, in particular, prescribing an order for the execution or performance of the control instructions by the applicable device by the presupposed control instructions. In particular, the presupposed control instructions may be control instructions of the same instruction sequence that, in particular, need to be executed before the control instructions that (currently) need to be executed by the applicable device. The presupposed control instructions in this instance are in particular likewise stored in control transactions that are in turn stored in data blocks (e.g., one data block or multiple data blocks) of the distributed database system.

In further embodiments of the control system, the execution requirements prescribe dependencies with respect to other control instructions of a data block or of various data blocks of a performance of the control instructions. Alternatively, the execution requirements prescribe dependencies with respect to other control instructions of a performance of the control instructions.

The control system is advantageous for, in particular, prescribing an order for the execution or performance of the control instructions by the applicable device by the presupposed control instructions. In particular, the presupposed control instructions may be control instructions of the same instruction sequence that, in particular, need to be executed before the control instructions that (currently) need to be executed by the applicable device. The presupposed control instructions in this instance were in particular likewise stored in control transactions that are in turn stored in data blocks (e.g., one data block or multiple data blocks) of the distributed database system.

In further embodiments of the control system, the execution requirements prescribe priorities for a performance of the control instructions.

The control system is advantageous for, in particular, giving preference to or prioritizing prescribed control instructions for the execution or performance of the control instructions by the applicable device. This may mean that the applicable control instructions are performed (e.g. by the devices or the distributed database system) faster or before other, nonpreferred control instructions. These control instructions to be given preference or these control instructions briefly given preference may be important/critical control instructions that need to be executed immediately, for example in order to prevent device damage, infrastructure damage or personal injury. If for example a monitoring device that is, in particular, likewise a node of the distributed database system discovers that the applicable device, e.g. a production device, is overheating or that a person is dangerously close to the device, then this monitoring device may set an applicable control transaction with control instructions and execution requirements (e.g. the execution requirements include the priority) to shut down the device in data blocks of the distributed database system. The distributed database system or the infrastructure thereof evaluates this control transaction and may convey the control transaction to the device that is to be shut down.

In further embodiments of the control system, the control instructions are executable by an applicable device if confirmation transactions for the presupposed control instructions of the respective execution requirements of the respective control transaction are available in the distributed database system.

In further embodiments of the control system, the execution requirements prescribe a time limit by which control instructions need to be performed.

The control system is advantageous for, in particular, using the execution requirements to prescribe for prescribed or selected control instructions a time limit by which the control instructions need to be performed by the applicable device. If this time limit is exceeded, for example, then, in particular, the checking module may provide a control signal in order to react to the exceeding of the time limit. The control signal may then be used to inform a production worker or a service engineer or to trigger an alarm signal in automated fashion, for example. It is also possible for the production process to be restarted, for example.

In further embodiments of the control system, the control system includes an optimizer that optimizes an execution of the control instructions by the devices based on a prescribed criterion.

The control system is advantageous for, in particular, optimizing a production process according to the prescribed criteria. The prescribed criteria may be the production time, the costs incurred, or the energy needing to be used. By way of example, the optimizer may break down an instruction sequence into control instructions that are in turn stored in the control transactions. This involves the optimizer breaking down the instruction sequence into the control instructions based on the prescribed criterion. If for example the criterion is to optimize the production time for producing a product (e.g. production time for the product needs to be kept as short as possible), the instruction sequence is broken down such that the individual components are manufactured in parallel by multiple devices (e.g., the applicable control instructions in control transactions are performed by these). If for example the criterion is to optimize the production costs for producing a product, the instruction sequence is broken down such that the individual components are manufactured serially by one device (e.g. the applicable device) or as few devices as possible (e.g., the applicable control instructions in control transactions are performed by the applicable devices). To control this, the optimizer transfers the applicable information to the determining module, for example, so that the determining module stores this information in the execution requirements. The optimizer may be a separate module or an integral part of the determining module. Alternatively, the optimizer may perform the optimization based on the execution requirements or may even create the execution requirements itself and provide them to the determining module.

In further embodiments of the control system, the distributed database system is a blockchain and the data blocks are blocks of the blockchain, or the distributed database system is a peer-2-peer database system.

The control system is advantageous for, in particular, realizing a local control system infrastructure. Moreover, it is, in particular, possible for such a control system to be realized even if the operators of the devices do not trust one another.

In further embodiments of the control system, the data blocks are concatenated with one another via a cryptographic hash function (H).

In further embodiments of the control system, the control system or the determining module includes an activity module, wherein the activity module is configured to display and/or document the activity of the control system and/or of the determining module.

The control system is advantageous for, in particular, making the activity checkable by an administrator during operation by a status lamp, a heartbeat signal or a control signal, for example. Alternatively, the activity module may write information to a file, for example in order to document system states or restarts of nodes or modules or of the determining module.

In further embodiments of the control system, the determining module determines the execution requirements and/or determines which of the control instructions is stored in control transactions, wherein which control instructions are stored in control transactions is determined based on the execution requirements.

This is advantageous for, in particular, first discovering which of the control instructions are executable by the devices and e.g. creating control transactions with execution requirements only for these instructions.

In further embodiments of the control system, the virtualization module ascertains the executability for prescribed devices or nodes and/or for prescribed control instructions.

In further embodiments of the control system, the optimizer optimizes the control instructions by the virtual images.

In further embodiments of the control system, the virtual images are used to ascertain an analysis of the effect of the execution of the control instructions on the devices and the distributed database system with the nodes.

In further embodiments of the control system, the virtual images are digital twins of the devices or nodes and/or a two-dimensional or three-dimensional virtual image, and/or the virtual images simulate mechanical or electrical properties of the devices and/or nodes, and/or the virtual images are used to perform a reliability analysis for a successful execution of the control instructions.

In further embodiments of the control system, the determining module determines the execution requirements and/or determines which of the control instructions is stored in control transactions, wherein which control instructions are stored in control transactions is determined based on the execution requirements. Storage may be effected if executability has been able to be confirmed or successfully ascertained based on the execution requirements.

This is advantageous for, in particular, having the devices check and/or allowing the devices to check whether and when the presupposed control instructions of the respective execution requirements are performed, or the execution requirements are met.

In further embodiments of the control system, the control instructions are executable by an applicable device if confirmation transactions for the presupposed control instructions of the respective execution requirements of the respective control transaction are available in the distributed database system. In other words, for example, confirmation transactions are available for the presupposed control instructions of the applicable execution requirements by virtue of the distributed database system providing the confirmation transactions so that, e.g., they may be retrieved by a/the device. By way of example, these confirmation transactions are stored in the distributed database system.

According to a further aspect, the disclosure relates to a determining module for a distributed database system or for a control system having a distributed database system for controlling and/or monitoring devices. The determining module includes a first interface for receiving or retrieving control instructions and a first evaluation unit. The first evaluation unit assigns execution requirements to the control instructions, an executability of the control instructions by nodes of a distributed database system or by devices is ascertained based on the execution requirements. The execution requirements include device-specific requirements and/or presupposed control instructions. The first determining module includes a virtualization module, wherein the virtualization module includes virtual images of the applicable nodes or of the applicable devices. The executability of the control instructions is ascertained by the virtual images.

The executability may be ascertained based on the execution requirements that need to be met, e.g., for an execution of the control instructions by applicable devices/nodes. To this end, the applicable execution requirements for the control instructions have been determined first, for example.

The determining module is advantageous for, in particular, improving the execution of control instructions by devices or nodes (e.g. production robots, control systems for a power distribution network, bank terminals, automated teller machines, money transfers between banks) that are connected to one another via a network.

Additionally, security during the operation of a distributed infrastructure (e.g. a distributed database system having devices and/or nodes or having devices that access the distributed database system) implemented wholly or in part by a distributed database system (e.g. a blockchain) may be increased, for example. In particular, the term "control instructions" may be understood broadly. In addition to the definition cited above, for example, it may also mean transactions that are supposed to be executed by a device (e.g. a node of a blockchain or a device outside the blockchain, e.g. device D). In other words, the apparatus converts in particular unchecked transactions into checked transactions, the check being performed based on the device-specific requirements and device-specific data that are supposed to execute the control instructions, for example.

The disclosure may be used to provide demanded device-specific requirements for the execution of the control instructions on the device, for example. The device-specific requirements may also be security requirements and/or location-related requirements (e.g. a country statement, a GPS statement or zip code (PLZ)) that a device is supposed to meet for executing the control instructions. As an alternative, specific/prescribed authentication may also be called for by the device-specific requirements for the execution, for example.

This may be the case if someone wishes to use a device (e.g. an automated teller machine) to withdraw cash. The control instructions are then, by way of example, the request by the customer to make a cash payment. If for example an applicable customer has specified (e.g. at his home bank or using online banking) that the customer e.g. permits a cash payment only in prescribed countries, (e.g. Italy, France and Austria), then this is stored in the device-specific requirements (and hence in particular implicitly in the execution requirements as well). An automated teller machine in Andorra might then not permit a payment or prevent a payment. It is also possible, by way of example, for the security requirements to call for prescribed authentication of and/or a prescribed authentication method for the customer. This may involve a pin being entered or required for a payment (which is not necessarily the case e.g. in the USA) and/or a specific pin length being required (e.g. 8 characters) and/or other additional authentication methods being required (e.g. 2-factor authentication, mobile TAN, Google Authenticator).

Alternatively, the determining module, e.g. the evaluation unit, may also analyze the control instructions further and, if for example the determining module or the (first) evaluation unit already discovers that the device-specific requirements are not met or are not meetable (e.g. the control instructions were sent from an unapproved country or are intended for a device or node in an unapproved country), may create a control transaction that indicates this to the applicable device or the system and may prevent or prohibit an execution of the control instructions. Alternatively, it is, by way of example, also possible for no control transaction to be produced, and at some point, there is a timeout for the execution of the control instructions, e.g. after a prescribed period. Alternatively or additionally, a control signal may be provided, for example, that e.g. informs an engineer or controls a warning signal in the event of control instructions being unexecutable.

It would, by way of example, also be conceivable for online banking to be protected in this manner by virtue of security requirements and/or location-related requirements of the computer (e.g., the device that sends control instructions) being checked for whether the payment is permitted by a(nother) device.

Additionally, the determining module may also include a first assigning module and/or a first memory module and/or further modules, as was explained in the exemplary embodiments. The nodes or devices may then include a checking module and/or an execution module, for example, as was explained in the exemplary embodiments or embodiments. It is also possible, in particular, for other features of the other aspects and exemplary embodiments to be transferred to this aspect.

The device-specific requirements for nodes or devices may also be user-related or include user-specific requirements, for example. By way of example, a first user may call for low precision for producing a workpiece in his assigned device-specific requirements. By way of example, a second user may then call for higher precision for producing a workpiece in his assigned device-specific requirements. In this way, it is e.g. also possible for security requirements to be stored in user-related fashion. It is, by way of example, also conceivable for specific types or kinds of control instructions—user-related or otherwise—to have assigned device-specific requirements that are taken into consideration by the determining module. By way of example, one requirement may be that a control instruction for loading firmware is performed only by a device that meets prescribed security requirements, e.g. in order to provide that expertise in the firmware is not readily accessible to anyone in a production installation. These prescribed security requirements may call for only specific personnel to have access to an applicable device or for the device to be protected by a password and/or other cryptographic mechanisms (e.g. access is possible only by inserting a chip card and entering a pin).

In particular, determining the dependencies of the control instructions or instruction sequence during the execution thereof by the devices or nodes may be difficult in a complex control system having a very large number of nodes or devices (e.g. 200-1000 devices/nodes). The virtualization module may be used to improve in particular the determination of the executability and the dependencies of control instructions on one another, because e.g. the performance of the control instructions and/or the allowance for the execution requirements and/or the dependencies between control instructions may be simulated or checked by the virtual images. This also allows in particular an optimization of the control instructions to be improved and also allows an accuracy of a statement about whether the control instructions are executable to be improved, for example.

For this purpose, the determining module may first ascertain the relevant devices and/or nodes for the execution of the control instructions and may instantiate the devices and/or nodes in or by the virtualization module as virtual images of the applicable nodes or the applicable devices. Instantiated virtual images of the applicable nodes and/or of the applicable devices then have the control instructions conveyed to them for execution.

The virtual images perform the control instructions, and the virtualization module captures execution parameters in the process. These parameters may be execution time, energy consumption, and material consumption.

Based on these execution parameters, the determining module may then establish whether or not the execution requirements are met. Alternatively or additionally, the applicable execution requirements may also be determined in this manner. Alternatively or additionally, these execution parameters may also be used to optimize the control instructions and/or execution requirements.

The determining module may be implemented with different complexity, in particular. By way of example, the execution requirements may be prescribed by a central policy, or the execution requirements are determined by the determining module and then assigned to the control instructions. When the execution requirements have been prescribed, the determining module may be in a form such that the respective control instructions are assigned the applicable execution requirements necessary for the execution thereof by the devices.

In further embodiments of the determining module, the determining module includes an optimizer, wherein the optimizer optimizes the execution of the control instructions by the devices based on a prescribed criterion.

In further embodiments of the determining module, the determining module includes a first breakdown module, wherein the first breakdown module is configured to break down an instruction sequence into the applicable control instructions. The applicable control instructions are provided to the control system or the first determining module, for example. The applicable control instructions may be provided to the control system via the determining module, so that e.g. the control system conveys the applicable control transactions with control instructions to the nodes or devices via the distributed database system.

In further embodiments of the determining module, the determining module includes an activity module, wherein the activity module is configured to display or document the activity of the apparatus and/or of the determining module.

The determining module is advantageous for, in particular, making the activity checkable by an administrator during operation by a status lamp, a heartbeat signal or a control signal, for example. Alternatively, the activity module may write information to a file, for example in order to document system states or restarts of nodes or modules or of the determining module.

In further embodiments of the determining module, the determining module includes a configuration memory that includes device-specific data about the devices and/or device-specific data about the nodes and/or the device-specific requirements.

The determining module is advantageous for, in particular, quickly accessing the device-specific data and/or configuring the device-specific requirements for specific transactions or devices in advance. The configuration memory may be realized by blocks or data blocks of the distributed database system, for example. The device-specific requirements for nodes or devices may also be user-related, for example. By way of example, a first user may call for low precision for producing a workpiece in his assigned device-specific requirements. By way of example, a second user may then call for higher precision for producing a workpiece in his assigned device-specific requirements. In this way, it is also possible for security requirements to be stored in user-related fashion. It is, by way of example, also conceivable for specific types or kinds of control instructions (user-related or otherwise) to have assigned device-specific requirements that are taken into consideration by the determining module. By way of example, one requirement may be that a control instruction for loading firmware is performed only by a device that meets prescribed security requirements, e.g. in order to provide that expertise in the firmware is not readily accessible to anyone in a production installation. These prescribed security requirements may call for only specific personnel to have access to an applicable device or for the device to be protected by a password and/or other cryptographic mechanisms (e.g. access is possible only by inserting a chip card and entering a pin).

In further embodiments of the determining module, the determining module includes an administrative interface.

The determining module is advantageous for, in particular, allowing a configuration of the determining module. The administrative interface may be used to configure the device-specific requirements and may store them in the distributed database system, for example.

In further embodiments of the determining module, the control instructions are executable by an applicable device if confirmation transactions for the presupposed control instructions of the respective execution requirements of the respective control transaction are available in the distributed database system.

This is advantageous for, in particular, having the devices check and/or allowing the devices to check whether and when the presupposed control instructions of the respective execution requirements are performed, or the execution requirements are met.

In further embodiments of the determining module, the determining module includes a capture unit for capturing device-specific data about the devices or device-specific data about nodes.

The determining module is advantageous for, in particular, facilitating and speeding up a check on and creation of the device-specific data. Although the determining module may re-request these data from the devices or nodes for every single determination each time, it is, in particular, more appropriate for the capture unit to request these data at prescribed times or intervals, for example, and e.g. to store them in a configuration memory, or the nodes and devices do this independently, e.g. after being switched on, at prescribed times or intervals, by virtue of this information being conveyed to the capture unit. If the capture unit is implemented as a smart contract of the distributed database system, for example, this may also be done when connecting to the distributed database system, for example.

In further embodiments of the determining module, the determining module is a node of a distributed database system or a smart contract of a distributed database system or in the form of a device.

In further embodiments of the determining module, the determining module includes a first assigning module for assigning the respective execution requirements to the control instructions.

In further embodiments of the determining module, the determining module includes a first memory module for storing the respective control instructions with the assigned execution requirements in control transactions, wherein in particular the control transactions are stored in data blocks of the distributed database system and/or in particular the control transactions are transmitted to the devices or the nodes by the data blocks. This may involve in particular the control instructions together with the assigned execution requirements being stored in the control transactions if the control instructions are executable by a device or a node.

Alternatively, the determining module includes a first memory module for storing the respective control instructions with the assigned execution requirements in control transactions, wherein in particular the control transactions are stored by the distributed database system and/or in particular the control transactions are transmitted to the devices or the nodes by the distributed database system. This may involve in particular the control instructions together with the assigned execution requirements being stored in the control transactions if the control instructions are executable by a device or a node.

In further embodiments of the determining module, the first evaluation unit determines the execution requirements for the execution based on the device-specific requirements and/or presupposed control instructions and device-specific data and/or already executed control instructions, wherein in particular the execution requirements are determined based on a result of a comparison of the device-specific requirements and/or presupposed control instructions with device-specific data and/or already executed control instructions.

In further embodiments of the determining module, the first evaluation unit determines the execution requirements for the execution based on an executability of the control instructions by a node of the distributed database system or a device, wherein in particular the execution requirements are determined based on a result of a check on an executability of the control instructions by a node of the distributed database system or a device.

In further embodiments of the determining module, the first evaluation unit determines the execution requirements for the execution of the control instructions (e.g., the execution requirements necessary for the execution of the control instructions) based on the device-specific requirements and/or presupposed control instructions and device-specific data and/or already executed control instructions and/or the applicable control instructions themselves and/or based on an instruction sequence. For example, the execution requirements are determined based on a result of a comparison of the device-specific requirements and/or presupposed control instructions with device-specific data and/or already executed control instructions. The instruction sequence may include stipulations for an execution of the control instructions.

In further embodiments of the determining module, the first evaluation unit determines an executability of the control instructions based on the execution requirements. The determining of the executability may involve the device-specific requirements and/or presupposed control instructions and/or device-specific data and/or already executed control instructions being taken into consideration. The execution requirements may be determined based on a result of a comparison of the device-specific requirements and/or presupposed control instructions with device-specific data and/or already executed control instructions.

According to a further aspect, the disclosure relates to an apparatus for a distributed database system or for a control system having a distributed database system for controlling and/or monitoring devices. The apparatus includes a first determining module. The distributed database system includes a multiplicity of nodes, wherein the nodes and the devices are connected to one another via a first communication network. The first determining module is configured to assign execution requirements to control instructions. The executability of the control instructions by nodes of the distributed database system or by devices is ascertained based on the execution requirements. The execution requirements include device-specific requirements and/or presupposed control instructions. The first determining module includes a virtualization module, wherein the virtualization module includes virtual images of the applicable nodes or of the applicable devices. The executability of the control instructions is ascertained by the virtual images.

In further embodiments of the apparatus, the control instructions are executable by an applicable device if confirmation transactions for the presupposed control instructions of the respective execution requirements of the respective control transaction are available in the distributed database system.

This is advantageous for, in particular, having the devices check and/or allowing the devices to check whether and when the presupposed control instructions of the respective execution requirements are performed, or the execution requirements are met.

According to a further aspect, the disclosure relates to a method for the computer-aided assignment of execution requirements for control instructions. The method includes: receiving or retrieving control instructions. The method further assigning execution requirements to the control instructions, wherein an executability of the control instructions by nodes of a distributed database system or by devices is ascertained based on the execution requirements. The execution requirements include device-specific requirements and/or presupposed control instructions. The distributed database system is a blockchain, for example. The method further includes calculating virtual images for the applicable nodes or the applicable devices, wherein the executability of the control instructions is ascertained by the virtual images.

According to a further aspect, the disclosure relates to a method for the computer-aided control of devices. The method includes assigning execution requirements to the control instructions, wherein an executability of the control instructions by nodes of a distributed database system or by devices is ascertained based on the execution requirements. The execution requirements include device-specific requirements and/or presupposed control instructions. The method further includes calculating virtual images for the applicable nodes or the applicable devices, wherein the executability of the control instructions is ascertained by the virtual images. The method further includes storing the respective control instructions with the applicable execution requirements in control transactions, wherein the control transactions are stored in data blocks of a distributed database system or the control transactions are stored by a distributed database system.

In further embodiments of the methods, the applicable methods include further method acts in order to implement the functional features or to implement further features of the control system or the determining module.

According to a further aspect, the disclosure relates to a device including a communication module for receiving data blocks of a distributed database system, wherein control transactions with control instructions for the device are stored in the data blocks of the distributed database system. The control transactions include execution requirements, wherein the execution requirements include device-specific requirements for the device and/or presupposed control instructions. The applicable execution requirements are assigned to the respective control transactions. The device further includes a first checking module for checking the respective execution requirements of the control instructions of one of the control transactions of a control instruction by the device, wherein the device-specific requirements for the device are checked; and/or checking is performed to ascertain whether confirmation transactions for the presupposed control instructions are available in data blocks of the distributed database system. The device further includes an execution module for executing the control instructions by the applicable device based on a result of the checking. The device further includes a second memory module for storing the result of the execution of the control instructions in confirmation transactions of the data blocks of the distributed database system.

In a further embodiment of the device, the device includes at least one further module or multiple further modules in order to implement possible embodiments of a device that are disclosed in the embodiments of the control system.

In addition, a computer program product having program instructions for performing the aforementioned methods is disclosed herein, wherein one of the methods, all of the methods or a combination of the methods disclosed herein is/are performable by the computer program product each time.

Additionally, a variant of the computer program product having program instructions for configuring a creating device, for example a 3D printer, a computer system or a manufacturing machine suitable for creating processors and/or devices, is claimed, wherein the creating device is configured using the program instructions such that the distributed database system and/or the control system and/or the device and/or determining module is created.

Furthermore, a providing apparatus for storing and/or providing the computer program product is claimed. The providing apparatus may be a data carrier that stores and/or provides the computer program product. Alternatively and/or additionally, the providing apparatus may be a network service, a computer system, a server system, in particular a distributed computer system, a cloud-based computer system and/or virtual computer system that stores and/or provides the computer program product, e.g., in the form of a data stream.

This provision is effected, by way of example, as a download in the form of a program data block and/or instruction data block, (e.g., as a file such as a download file, or as a data stream such as a download data stream), of the complete computer program product. This provision may alternatively be effected as a partial download that includes multiple parts and, in particular, is downloaded via a peer-to-peer network or provided as a data stream. Such a computer program product is read into a system by using the providing apparatus in the form of the data carrier, for example, and executes the program instructions, so that the method is carried out on a computer or configures the creating device such that it creates the distributed database system and/or the control system and/or the device and/or the determining module.

BRIEF DESCRIPTION OF THE DRAWINGS

The properties, features, and advantages of this disclosure that are described above and the way in which they are achieved will become clearer and more clearly comprehensible in association with the description of the exemplary embodiments that follows, the exemplary embodiments being explained in more detail in association with the figures, in which, in a schematic depiction.

In the figures, elements having the same function are provided with the same reference signs, unless indicated otherwise.

DETAILED DESCRIPTION

The exemplary embodiments below, unless indicated otherwise or already indicated, have at least one processor and/or a memory unit in order to implement or carry out the method.

Moreover, in particular a (relevant) person skilled in the art, with knowledge of the method claim/method claims, is of course aware of all routine options for realizing products or options for implementation in the prior art, and so there is no need in particular for independent disclosure in the description. In particular, these customary realization variants known to a person skilled in the art may be realized exclusively by hardware (components) or exclusively by software (components). Alternatively and/or additionally, a person skilled in the art, within the scope of his/her expert ability, may choose to the greatest possible extent arbitrary combinations of hardware (components) and software (components) in order to implement realization variants.

A combination of hardware (components) and software (components) may occur in particular if one portion of the effects is brought about, e.g., exclusively by special hardware (e.g. a processor in the form of an ASIC or FPGA) and/or another portion by the (processor- and/or memory-aided) software.

In particular, in view of the high number of different realization options, it is impossible and also not helpful or necessary for the understanding of the disclosure to name all these realization options. In this respect, in particular all the exemplary embodiments below are intended to demonstrate merely by way of example a few ways in which in particular such realizations of the teaching may be manifested.

Consequently, in particular the features of the individual exemplary embodiments are not restricted to the respective exemplary embodiment, but rather relate to the disclosure in general. Accordingly, features of one exemplary embodiment may also serve as features for another exemplary embodiment, in particular without this having to be explicitly stated in the respective exemplary embodiment.

Figure 1:
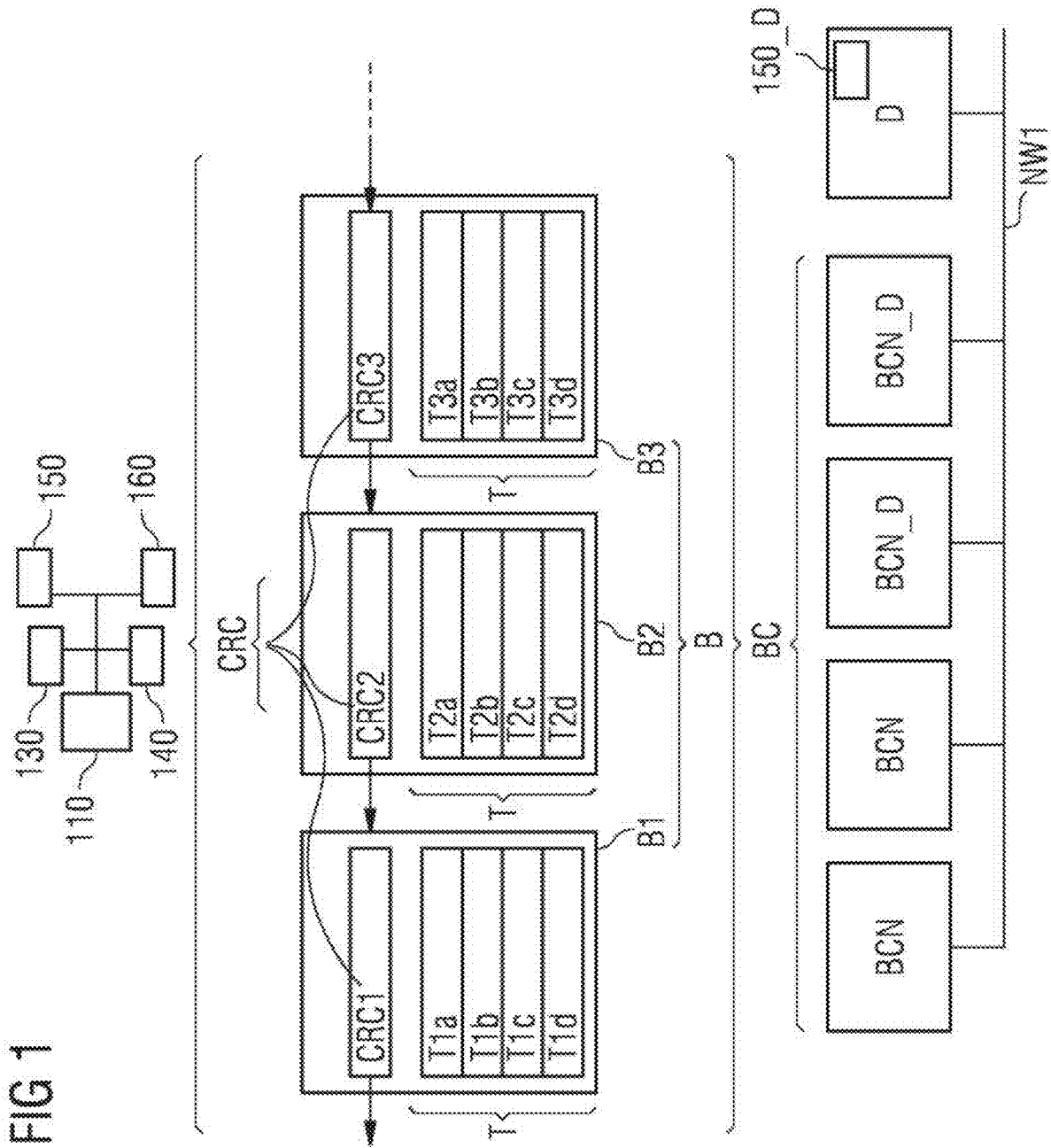
FIG. 1 depicts a first exemplary embodiment.

FIG. 1 depicts a first exemplary embodiment. In so doing, FIG. 1 depicts a control system for controlling and/or monitoring devices, the distributed database system being realized by a blockchain BC, for example.

The exemplary embodiment of a control system for controlling and/or monitoring devices may, in one variant, include the following features. For example, the control system may include a distributed database system (BC) having a multiplicity of nodes (BCN, BCN_D), wherein the nodes (BCN, BCN_D) and the devices (D, BCN_D) are connected to one another via a first communication network (NW1).

The system may also include a first determining module (110), wherein the first determining module may be configured to assign execution requirements to control instructions, wherein an executability of the control instructions by nodes of the distributed database system or by devices may be ascertained based on the execution requirements (it is thus, in particular, ascertained whether the applicable nodes or devices are capable of executing the control instructions e.g. by virtue of the applicable execution requirements for the control instructions being checked—e.g. whether the devices meet the execution requirements). The execution requirements may include device-specific requirements and/or presupposed control instructions. The first determining module may include a virtualization module, wherein the virtualization module may include virtual images of the applicable nodes or of the applicable devices. The executability of the control instructions may be ascertained by the virtual images.

The system may also include a first memory module (130) for storing the respective control instructions with the assigned execution requirements in control transactions, wherein the control transactions may be stored in data blocks (B) of the distributed database system (BC) or for example the control transactions are stored by the distributed database system (BC). The control transactions may be transmitted to the devices (D, BCN_D) by the data blocks (B) or for example the control transactions are transmitted to the devices (D, BCN_D) by the distributed database system (BC).

The system may further include a first checking module for checking the respective execution requirements for the execution of the control instructions of one of the control transactions by an applicable device, wherein the device-specific requirements for the applicable device may be checked and/or checking is performed to ascertain whether confirmation transactions for the presupposed control instructions are available in data blocks of the distributed database system or whether for example confirmation transactions for the presupposed control instructions are available in the distributed database system.

The system may further include an execution module for executing the control instructions by the applicable device based on a result of the checking. The system may further include a second memory module for storing the result of the execution of the control instructions in confirmation transactions of the data blocks of the distributed database system.

Alternatively or additionally, e.g. the second memory module may be configured to store the result of the execution of the control instructions in confirmation transactions of the distributed database system.

In detail, FIG. 1 depicts blocks B, for example a first block B1, a second block B2 and a third block B3, of the blockchain BC.

Each block B includes multiple transactions T. The transactions T may include control transactions and/or confirmation transactions.

The first block B1 includes a first transaction T1$a$, a second transaction T1$b$, a third transaction T1$c$ and a fourth transaction T1$d$, for example.

The second block B2 includes a fifth transaction T2$a$, a sixth transaction T2$b$, a seventh transaction T2$c$ and an eighth transaction T2$d$, for example.

The third block B3 includes a ninth transaction T3$a$, a tenth transaction T3$b$, an eleventh transaction T3$c$ and a twelfth transaction T3$d$, for example.

Each block B also includes one of the concatenation checksums CRC formed based on the direct predecessor block. The first block B1 therefore includes a first concatenation checksum CRC1 from its predecessor block, the second block B2 includes a second concatenation checksum CRC2 from the first block B1, and the third block B3 includes a third concatenation checksum CRC3 from the second block B2.

The respective concatenation checksum CRC1, CRC2, CRC3 may be formed for the block header of the applicable predecessor block. The concatenation checksums CRC may be formed by using a cryptographic hash function such as e.g. SHA-256, KECCAK-256 or SHA-3. By way of example, the concatenation checksum may additionally be calculated for the data block checksum, or the header includes the data block checksum (the data block checksum is explained subsequently).

Additionally, each of the blocks may include a data block checksum. This may be realized by a hash tree, for example.

In order to form the hash tree, a transaction checksum (e.g. likewise a hash value) is calculated for each transaction of a data (block). Alternatively or additionally, a transaction checksum created by the originator of the transaction, (e.g., when the transaction was generated), may continue to be used therefor.

In certain embodiments, e.g. a Merkle tree or Patricia tree, the root hash value/root checksum of which may be stored in the respective blocks as applicable data block checksum, is used for a hash tree.

In one variant, the data block checksum is used as concatenation checksum.

A block may furthermore have a timestamp, a digital signature, proof-of-work evidence, as was explained in the embodiments.

The blockchain BC itself is realized by a blockchain infrastructure having multiple blockchain nodes BCN, BCN_D. The nodes may be computers, blockchain oracles, trusted nodes or one or more or all of the devices that are supposed to be controlled or monitored. In other words, it is, in particular, possible for the devices to be in the form of blockchain nodes, which are then referred to as device nodes BCN_D, for example. Devices that are not in the form of blockchain nodes, for example, and that effect only read access to the blockchain, for example, are, in particular, referred to as blockchain-external devices D. The nodes are communicatively connected to one another via a first network NW1 (e.g. a communication network such as the Internet or an Ethernet network). The blockchain infrastructure is used to replicate at least some of the data blocks B or all of the data blocks B of the blockchain BC for some or all nodes of the blockchain, for example.

In particular, devices may be understood to mean blockchain-external devices D or device nodes BCN_D.

The control system realized by the blockchain BC moreover includes a first determining module 110, a first memory module 130, a first checking module 140, a first execution module 150 and a second memory module 160, which are communicatively connected to one another via the control system (e.g. a bus) or via the blockchain and the infrastructure thereof (e.g. the first network NW1). The first (communication) network NW1 may be a mobile radio network, an Ethernet network, a WAN, an LAN, or the Internet. The first checking module 140, the first execution module 150 and/or the second memory module 160 may, in implementation variants, be optional modules.

The first determining module 110 is configured for assignment, wherein the first determining module assigns execution requirements to control instructions. An executability of the control instructions by nodes of the distributed database system or by devices is ascertained based on the execution requirements. The execution requirements include device-specific requirements and/or presupposed control instructions (e.g. for this purpose the execution requirements have been ascertained for the control instructions first). The first determining module includes a virtualization module. The virtualization module includes virtual images of the applicable nodes or of the applicable devices. The executability of the control instructions is ascertained by the virtual images.

The storage may take place (including in the preceding exemplary embodiments) if execution requirements were assigned for control instructions.

In particular, determining the dependencies of the control instructions or instruction sequence during the execution thereof by the devices or nodes may be difficult in a complex control system having a very large number of nodes or devices (e.g. 200-1000 devices/nodes). The virtualization module may be used to improve the determination of the executability and the dependencies of control instructions on one another, because e.g. the performance of the control instructions and/or the allowance for the execution requirements (e.g. the device-specific requirements) and/or the dependencies between control instructions may be simulated or checked by the virtual images. This also allows in particular an optimization of the control instructions to be improved and also allows an accuracy of a statement about whether the control instructions are executable to be improved, for example.

For this purpose, the determining module may first ascertain the relevant devices and/or nodes for the execution of the control instructions and may instantiate the devices and/or nodes in or by the virtualization module as virtual images of the applicable nodes or the applicable devices. Instantiated virtual images of the applicable nodes and/or of the applicable devices then have the control instructions conveyed to them for execution.

The virtual images perform the control instructions, and the virtualization module captures execution parameters in the process. These are e.g. execution time, energy consumption, and material consumption, or a simulated variable for these parameters.

Based on these execution parameters, the determining module may then establish whether or not the execution requirements are met. Alternatively or additionally, the applicable execution requirements may also be determined in this manner. Alternatively or additionally, these execution parameters may also be used to optimize the control instructions and/or execution requirements.

It is thus possible for the virtualization module to ascertain for example the executability for prescribed control instructions by the applicable prescribed devices or nodes.

In a further variant, the optimizer may optimize the control instructions by the virtual images and the captured execution parameters.

In a further variant, the virtual images are used to ascertain an analysis of the effect of the execution of the control instructions on the devices and the distributed database system with the nodes.

The virtual images may be realized for example as digital twins of the devices or the nodes and/or as a two-dimensional and/or three-dimensional virtual image.

Alternatively or additionally, the virtual images may simulate mechanical or electrical properties of the devices and/or the nodes.

Alternatively or additionally, the virtual images may be used to perform a reliability analysis for a successful execution of the control instructions. This may be accomplished by performing for example an FMEA (Failure Mode and Effects Analysis, or "effects analysis" for short) and FMECA (Failure Mode and Effects and Criticality Analysis) for an execution of the control instructions by the devices/nodes.

If the result of the check may be that the control instructions may be executed only inadequately (e.g. the result of the FMEA is a successful execution of the control instructions with a probability of 40%) and/or specific stipulations of the execution requirements (e.g. a successful probability of at least 90% is demanded for an execution of the control instructions) are not met, a control transaction permitting an execution of the control instructions is not created for the applicable control instructions. Alternatively or additionally, if the execution requirements are not met, a control transaction that explicitly prevents an execution of the control instructions may be created and stored.

The execution requirements necessary for these calculations may be calculated from a policy, for example, by virtue of a database with such a policy being queried, or the execution requirements are determined for the applicable control instructions, as explained below. The effect achieved thereby is in particular that no complex calculations or device queries need to be performed again in order to determine the execution requirements, or access to a slow database connection may be dispensed with.

Furthermore, in one variant, the determining module may be configured to determine execution requirements for an execution of control instructions by the devices, wherein device-specific requirements and/or presupposed control instructions are stored in the execution requirements or includes these. In a specific implementation, the execution requirements (alternatively simply called requirements) may be stored in requirement data records, for example, which are in turn then stored in the transactions (e.g. in control transactions). The first determining module itself may be realized as a software component (e.g. as a smart contract) or as a hardware component or as a combination of hardware and software components, for example.

As a software component, the first determining module 110 may be realized as a smart contract, for example, which is executed by the blockchain or the infrastructure thereof. To this end, the smart contract is stored in transactions, for example, which are in turn stored in data blocks or blocks of the blockchain BC.

The execution requirements may be calculated by the determining module for example individually for applicable control instructions and then assigned to the latter e.g. by an assigning module. Alternatively, the execution requirements may be prescribed by a policy (e.g. configured execution rules). These execution requirements are then assigned to the applicable control instructions by the determining module or the assigning module. The determining module determines which of the execution requirements are relevant for the applicable control instructions. By way of example, control instructions for milling drill holes are assigned to execution requirements that the drill holes are supposed to be milled with a prescribed accuracy/precision and/or specific temperatures are not supposed to be exceeded during milling. These execution requirements may then be checked by the devices or checking modules to ascertain whether an applicable device meets the execution requirements.

As a hardware component, the first determining module 110 may be realized by a blockchain oracle and/or a node/device of the blockchain, for example, which are in particular trustworthy, for example, and use a digital certificate or digital signatures to sign the execution requirements.

Optionally, the control system may include a first breakdown module that is in the form of an integral module of the first determining module 110, for example, or is in the form of a separate module (e.g. in the form of a software and/or hardware component)—analogously to the first determining module (e.g. in the form of a smart contract of the blockchain). The first breakdown module is configured to break down an instruction sequence into the applicable control instructions and to provide them to the control system, in particular the first determining module or the first memory module.

The instruction sequence may include control instructions for a multiplicity of devices, e.g. production machines, so that these produce an item or a product, e.g. a gas turbine or an electric motor. Alternatively or additionally, the instruction sequence includes a specification of the product, which specification is supposed to be implemented by the devices. The instruction sequence does not necessarily have to be directed to the production of a product. It may also be the control of a power supply system, for example. The instruction sequence itself may be a smart contract, for example, that was stored in the blockchain. This smart contract may then be evaluated by the control system (or the first breakdown module and/or the first determining module), for example, with the blockchain or the infrastructure thereof.

It is also possible for the instruction sequence to be encrypted, for example, so that the first determining module 110 or the first breakdown module first needs to decrypt the instruction sequence before the instruction sequence may be broken down.

Alternatively or additionally, the control instructions of the instruction sequence are encrypted and applicable requirements for the execution thereof are stored in the instruction sequence as plain text.

The instruction sequence itself and/or the control instructions may be provided to the control system by a user, by an interface, by another database or by an input device, for example.

Alternatively or additionally, the control instructions and/or the execution requirements are encrypted by the first determining module 110, for example in order to realize protection of expertise. By way of example, the applicable device D for executing the control instructions and/or the first checking module 140 and/or the first execution module 150, 150_D have applicable cryptographic modules or mechanisms. By way of example, the cryptographic modules or mechanisms are an applicable cryptographic key, in order to decrypt the control instructions and/or the execution requirements.

The first breakdown module and the first determining module first break down the instruction sequence into control instructions or determine the control instructions based on the instruction sequence, the control instructions also being able to be a group of control instructions or multiple control instructions. The first determining module 110 may know the available devices and/or nodes and determines execution requirements for the control instructions (which may also be a group of control instructions). Alternatively, the execution requirements may be already encoded/stored in the instruction sequence, and the first determining module 110 uses this information to determine the execution requirements for the applicable control instructions.

Additionally, the control system may include an optimizer that uses the execution requirements to optimize an execution of the control instructions by the devices based on a prescribed criterion. Alternatively, the optimizer determines the execution requirements and provides them to the first determining module 110.

The control system is therefore capable of optimizing a production process according to the prescribed criteria, for example. The prescribed criteria may be the production time, the costs incurred or the energy needing to be used, for example. The optimizer may be an integral module of the first breakdown module or the first determining module, for example. Alternatively, the optimizer may be in the form of a stand-alone module of the control system.

If the optimizer is an integral module of the breakdown module or of the determining module, for example, it may perform the optimization when the instruction sequence is broken down into control instructions and when the execution requirements are determined. This involves the first breakdown module or the first determining module 110 using the optimizer, for example when breaking down the instruction sequence into the control instructions, to take into consideration the prescribed criterion.

If for example the criterion is to optimize the production time for producing a product (e.g. to keep production time for the product as short as possible), the instruction sequence is broken down, and/or accordingly optimized execution requirements are calculated, such that the individual components of the product are manufactured in parallel by multiple devices (e.g., the applicable control instructions in control transactions are performed by these). If for example the criterion is to optimize the production costs for producing a product, the instruction sequence is broken down, and/or accordingly optimized execution requirements are calculated, such that the individual components are manufactured serially by one device (e.g. the applicable device) or as few devices as possible (e.g., the applicable control instructions in control transactions are performed by the applicable devices/nodes). To control this, the optimizer transfers the applicable information to the determining module, for example, so that the determining module stores this information in the execution requirements.

In one variant, the determining module is a determining module for a distributed database system or for a control system having a distributed database system for controlling and/or monitoring devices. In this variant, it has a processor and optionally a memory unit. The processor is configured to determine execution requirements for an execution of control instructions by the devices, wherein device-specific requirements and/or presupposed control instructions are stored in the execution requirements, and the execution requirements are stored in transactions of the distributed database system. Additionally, the determining module may include the variant embodiments and the cited features from FIG. 4 and FIG. 5, for example.

If the determining module includes an assigning module, for example, the assigning module is configured to assign the respective execution requirements to the control instructions, for example. The assigning module may be in the form of a software and/or hardware component, for example—analogously to the first determining module 110 (e.g. in the form of a smart contract of the blockchain or in the form of trusted nodes of the blockchain). The assigning module may be realized by the blockchain or a smart contract or is a software component of the blockchain infrastructure.

If for example the execution of control instructions or control transactions requires no presupposed control instructions, the presupposed control instructions may be blank, in particular. By way of example, they may be filled with a zero, filled with a blank string or with a value indicating that no presupposed control instructions are needed. Alternatively, for example some of the control instructions may have no assigned execution requirement, in particular at least one of the control instructions having at least one assigned execution requirement.

The first memory module 130 is configured to store the respective control instructions with the assigned execution requirements in control transactions, the control transactions being stored in data blocks B of the distributed database system (BC). The control transactions are transmitted to the devices D, BCN_D by the data blocks B, for example. This is accomplished for example by virtue of the applicable data blocks being transmitted to the applicable nodes by the blockchain via the first network NW1, e.g. if the data blocks are replicated for the blockchain and/or nodes and/or specific nodes. If for example a blockchain-external device is involved, then it may be transmitted to such a device via an interface (e.g. a web interface) of the blockchain, for example, or such a device itself retrieves the applicable data from the blockchain e.g. after a prescribed time interval.

Determining the control instructions by the first determining module 110 may involve the control instructions being determined in device-specific fashion. This means in particular that initially groups of control instructions are formed that may be performed completely by an applicable device. These groups of control instructions may also simply be called control instructions. These groups of control instructions, or control instructions, then have the execution prerequisites calculated for them—as was explained above. Storage then involves an applicable group of control instructions, or the applicable control instructions, being stored together with the associated/applicable execution prerequisites in a control transaction. Accordingly, the control transactions may include device-specific control instructions.

Figure 4:
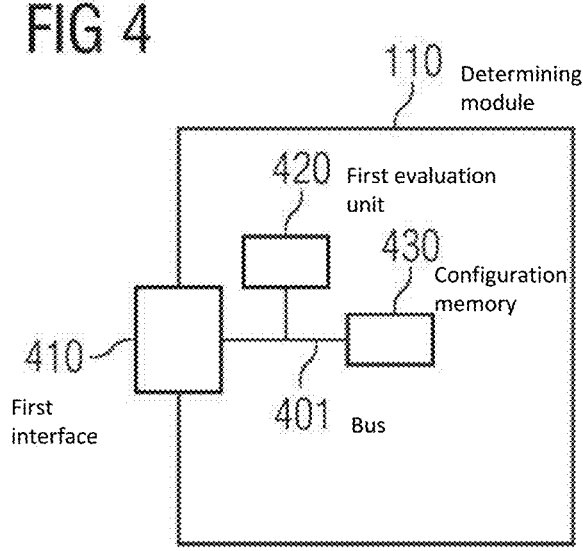
FIG. 4 depicts a further exemplary embodiment.
Figure 5:
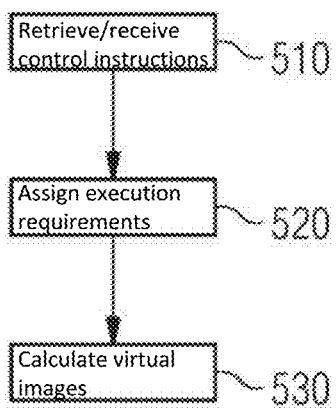
FIG. 5 depicts a further exemplary embodiment.

The determining module may also be a determining module or one of the embodiments of the determining module, or a determining module as explained in FIG. 4 and/or FIG. 5.

Storage may be performed in different ways. By way of example, a control instruction or multiple control instructions may be stored in a specific control transaction, this specific control transaction including the applicable execution requirements for the control instruction or the multiple control instructions. This integral approach is advantageous for accessing the data as easily as possible.

Alternatively, the applicable execution requirements may be stored in an individual or separate control transaction, the individual transaction including a reference or pointer concerning the control instruction or control instructions to which these applicable execution requirements relate. This is accomplished for example with a block number (of a block) with the applicable (control) transactions (with control instructions), a checksum of the block or transaction that includes the control instructions. This is advantageous if the execution requirements are first determined during the performance of the control instructions by the applicable devices. A device (or the first checking module 140, or the first execution module 150), e.g. the applicable device performing the control instructions or some of the control instructions of a control transaction, begins performing the applicable control instructions only when the applicable execution requirements are available in a control transaction in the blockchain. Otherwise, the device, or the first checking module 140, or the first execution module 150, waits until this control transaction with the applicable execution requirements are provided by the blockchain BC.

The first memory module 130 may be in the form of a software and/or hardware component, for example—analogously to the first determining module 110 (e.g. in the form of a smart contract of the blockchain or in the form of trusted nodes of the blockchain). The first memory module 130 may be realized by the blockchain or a smart contract or is a software component of the blockchain infrastructure.

The first checking module 140 is configured to check the respective execution requirements for the execution of the control instructions of one of the control transactions by an applicable device, wherein the device-specific requirements of the respective execution requirements of the respective control transaction for the applicable device are checked and/or checking is performed to ascertain whether confirmation transactions for the presupposed control instructions of the respective execution requirements of the respective control transaction are available in data blocks of the distributed database system.

In particular, "one of the control instructions" means one or more of the control instructions (i.e. it is e.g. one or more control instructions). Alternatively, "with one of the control instructions" is intended to be understood to mean "at least one of the control instructions." "One of the control instructions" may be the control instructions of an applicable control transaction.

The first checking module 140 may be in the form of a software and/or hardware component, for example—analogously to the first determining module 110 (e.g. in the form of a smart contract of the blockchain or in the form of trusted nodes of the blockchain). The first checking module 140 may be realized by the blockchain or a smart contract or is a software component of the blockchain infrastructure or is a component of a node or of a device that may execute the control instructions.

When the check on the control instructions of a data block that are supposed to be executed by the applicable device has been completed by the first checking module 140, a result of the check is provided in a data record. The first checking module 140 may also perform additional checks, for example. By way of example, the transaction checksum or the data block checksum may be checked. If an applicable checksum is a digital signature or a certificate, then it is possible, by way of example, to check whether the issuer or checksum generator is actually authorized for its control instructions to be performed on the device or by the device.

By way of example, it is also possible to check whether the applicable device has a required digital certificate stating, by way of example, that the applicable device is trusted. This may be necessary, for example, if control instructions including expertise that is not supposed to be made accessible to the public are involved.

It is, by way of example, also conceivable for the control instructions to be cryptographically encrypted and, in some embodiments, for only the applicable device D to include modules or mechanisms (e.g., an applicable key) for reversing this cryptographic encryption. The modules or mechanisms may be included by the applicable device D itself, or the execution module 150, 150_D includes these modules or mechanisms.

The execution module 150, 150_D is configured to execute the control instructions by the applicable device based on the result of the checking. If the check reveals or if the result includes a confirmation for the execution of the control instructions, the applicable device executes these control instructions. By way of example, it may drill a hole in a component in accordance with the specifications of the control instructions that were originally specified in the instruction sequence. If the check reveals or the result includes no confirmation for the execution of the control instructions, then a performance/execution of the control instructions is prevented.

If for example the result states that the control instructions are not supposed to be executed by the applicable device, a control signal may be provided, for example. The control signal may be used to annul for example an alarm, a service engineer or the control instructions (e.g., all of them) that were produced based on an instruction sequence, so that other control instructions of the instruction sequence are no longer executed by other devices. This may involve an applicable control transaction being stored with such a control instruction for all devices in a block of the blockchain BC and being conveyed to the devices by the blockchain BC. Such a control transaction may likewise include execution requirements including a priority. This priority may be higher than a priority of the other control instructions. This increased priority results in the applicable control instruction being performed preferentially by the devices in order to invalidate (annul) or prevent the execution of the remainder of the control instructions of the instruction sequence, for example.

If the first checking module 140 is a module of the blockchain BC, for example, then the first checking module 140 includes a list of the devices with their device-specific properties, for example, which may be used to check the device-specific requirements. Alternatively, the first checking module 140 may include a list of the devices and their network addresses, and may request the applicable device-specific properties from the devices itself. This is advantageous for taking into consideration the current operating state of the devices for the check.

The first execution module 150, 150_D may be in the form of a software and/or hardware component, for example—analogously to the first determining module 110 (e.g. in the form of a smart contract of the blockchain or in the form of trusted nodes of the blockchain). The execution module may be realized by the blockchain or a smart contract or is a software component of the blockchain infrastructure or is a component of a node (e.g. a blockchain execution module 150) or of a device (e.g. a device execution module 150_D) that may execute the control instructions.

If the first execution module is a module of the blockchain, for example, then the first execution module 150 includes a list of the devices and the network addresses thereof, for example, in order to actuate the devices for the performance of the control instructions.

The second memory module 160 is configured to store the result of the execution of the control instructions in confirmation transactions of the data blocks of the distributed database system.

If the performance of the control instructions by the applicable device was successful, then this information is stored in a confirmation transaction in the blockchain. If there are for example other control instructions that presuppose a performance of the now performed control instructions (e.g., presupposed control instructions), these other control instructions may now be performed by another applicable device or the same applicable device, provided that the remainder of the execution requirements are also met.

The second memory module 160 may be in the form of a software and/or hardware component, for example—analogously to the first determining module 110 (e.g. in the form of a smart contract of the blockchain or in the form of trusted nodes of the blockchain). The second memory module 160 may be realized by the blockchain or a smart contract or is a software component of the blockchain infrastructure or is a component of a node that may execute the control instructions.

The control system and/or the distributed database system or its nodes (e.g. blockchain nodes, devices (e.g., device nodes and blockchain-external devices)) may additionally also include a further or multiple further component/s, such as for example a processor, a memory unit, further communication interfaces (e.g. Ethernet, WLAN), an input device, in particular a computer keyboard or a computer mouse, and a display device (e.g. a monitor). The processor may include multiple further processors, for example, that may be used to realize further exemplary embodiments, in particular. The further component/s may likewise be communicatively connected to one another by the blockchain or the infrastructure thereof, for example.

The processor may be an ASIC, for example, that was realized on an application-specific basis for the functions of a respective module or of all modules of the exemplary embodiment (and/or of further exemplary embodiments), the program component or the program instructions being realized as integrated circuits, in particular. The processor may also be an FPGA, for example, that, in particular, is configured by the program instructions such that the FPGA performs the functions of a respective module or of all modules of the exemplary embodiment (and/or of further exemplary embodiments).

Depending on the chosen implementation variant, the distributed database system may include the first checking module and/or the first execution module and/or the second memory module.

In this implementation variant, the devices are kept simple—e.g. without such corresponding modules. This is advantageous to make the devices as simple as possible and interface them with the distributed database system. This allows inexpensive devices to be used, in particular.

In a further implementation variant, the devices include a first device checking module and/or a first device execution module and/or a second device memory module. Depending on the chosen implementation, the first checking module and/or the first execution module and/or a second memory module, when their functionalities/tasks are realized/performed, may access the corresponding modules of the devices.

In other words, the control system or the distributed database system knows the applicable device modules (e.g. by data stored in a table). The first checking module 140 and/or the first execution module 150 and/or the second memory module 160 have information concerning how the device modules 150_D may be addressed or actuated (e.g. via a module-internal table that may automatically update itself, for example, via broadcast messages in the first communication network NW1 or via the distributed database system BC). The first checking module and/or the first execution module and/or the second memory module may implement only the portion that distributes or conveys the necessary information or tasks to the applicable device or the applicable devices (e.g. the control transactions or the confirmation transactions or the result of the checking by the checking module). The remainder of the functionality is realized by the device modules.

This is advantageous for relocating all or some more computation-intensive checking tasks by the first checking module or execution tasks by the first execution module to the applicable devices.

The control system may also include an optional registration module.

The registration module may be in the form of a software and/or hardware component, for example—analogously to the first determining module 110 (e.g. in the form of a smart contract of the blockchain or in the form of trusted nodes of the blockchain). The registration module may be realized by the blockchain or a smart contract or is a software component of the blockchain infrastructure. Alternatively, the registration module may be realized as a specific trusted node, the network address of which is known publicly, for example. If a closed distributed database system in which only authorized nodes and/or devices are interfaced with the control system or with the distributed database system is involved, for example, then, in particular, solely the network address of the registration module is known publicly.

The registration module is configured to add new nodes and/or devices to the control system. As soon as a new device and/or node wishes to join the control system or the distributed database system, the new device or the new node sends a query to the registration module. This may be done directly, for example by virtue of node and/or device information being conveyed directly to the registration module. If this is done indirectly, the query is forwarded between the nodes and modules of the distributed database system until the query reaches the registration module.

The node and/or device information may include: device address/node address; operator of the device/node; scope of functions of the device/node; cryptographic keys (e.g. for checking checksums/digital signatures produced by the device/node); and/or further properties needed for checking the execution requirements.

The node and/or device information may then be stored in the control system (e.g. in applicable tables), for example, so that the checking and/or execution of the control instructions or control transactions may be performed by the applicable modules.

If the database system is a closed distributed database system, for example, the registration module also checks whether the device/node has access authorization (e.g., whether in particular the device/node is accepted as part of the control system or of the distributed database system). For this, the device/node provides authentication information (cryptographic keys, passwords, etc.), for example, that is checked by the registration module.

If the database system is an open distributed database system, for example, then the node and/or device information is captured, for example.

Depending on the implementation variant, the checking module 140 and/or the execution module 150 and/or the second memory module 160 are optional modules.

Figure 2:
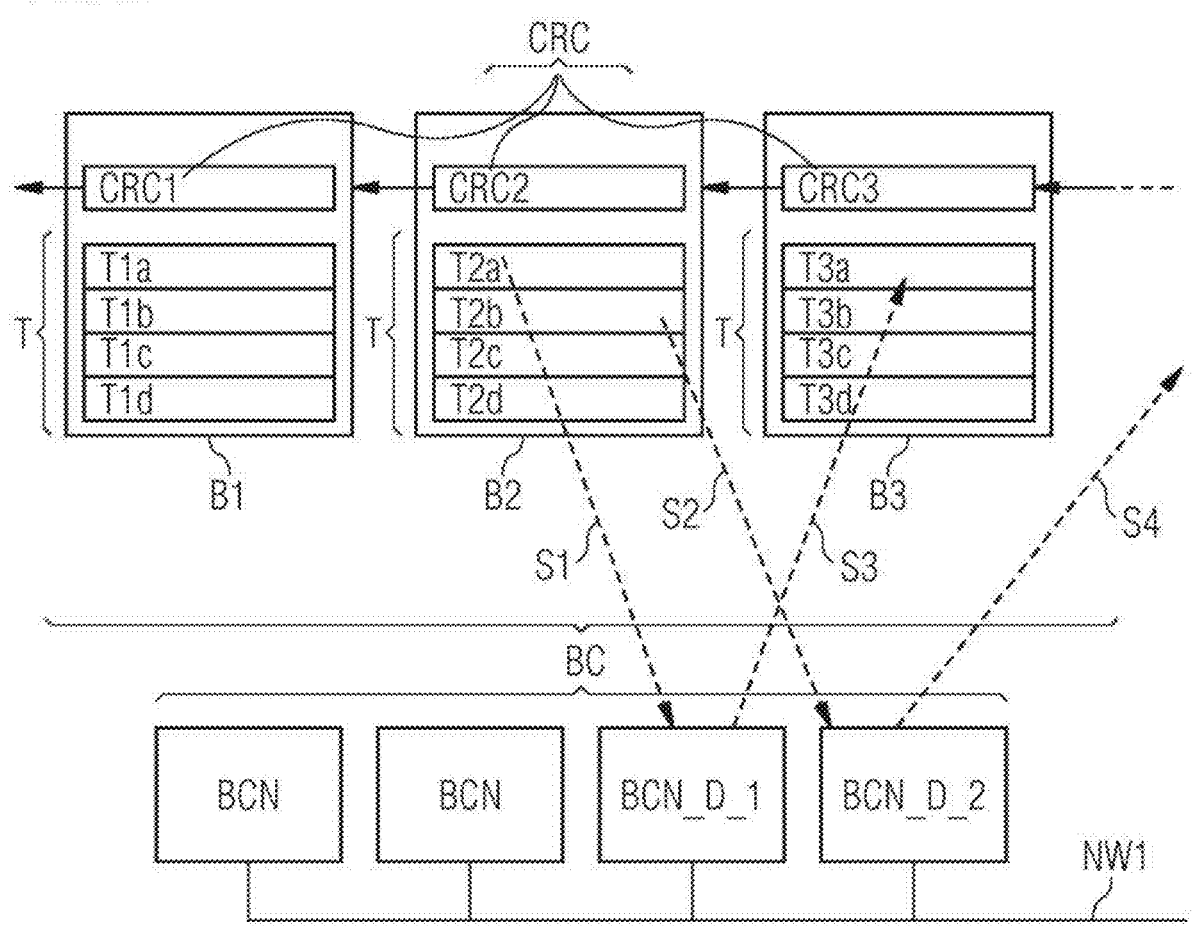
FIG. 2 depicts a further exemplary embodiment.

FIG. 2 depicts a second exemplary embodiment, which implements control of devices that are realized as nodes of the blockchain BC.

This variant may also be realized by the exemplary embodiment from FIG. 1 or is compatible with this figure. Accordingly, the control system from FIG. 2 may likewise have one or more modules of the control system from FIG. 1.

The control system, which is realized as blockchain BC, provides multiple transactions T, which may also include control transactions.

By way of example, the fifth transaction T2a is a first control transaction including first control instructions and first execution requirements assigned to these control instructions. The sixth transaction T2b may be a second control transaction including second control instructions and second execution requirements assigned to these control instructions. The second execution requirements call for the presupposed control instructions to be that the second control instructions are executed by a specific device, for example a second device node BCN_D_2, and that the first control instructions need to be executed by a specific device node, for example a first device node BCN_D_1, before the second device node BCN_D_2 may begin performing the second control instructions.

In other words, the second execution requirements for the second control instructions stipulate that the execution thereof is begun if the first control instructions were executed and a confirmation for the execution thereof is provided by the blockchain in (confirmation) transactions stored in blocks of the blockchain.

In a first act S1, the first control instructions of the first control transaction are conveyed to the first device node BCN_D_1 by the blockchain and executed by the first device node BCN_D_1. Following successful performance of the first control instructions by the first device node BCN_D_1, a confirmation about this performance is written to a confirmation transaction for this purpose and stored in a data block of the blockchain in a second act S2. This is the ninth transaction T3a in this exemplary embodiment.

After the execution requirements for the second control instructions are met, the second control transaction is conveyed to the second device node BCN_D_2 by the blockchain in a third act S3. This may be done by the blockchain itself—as depicted e.g. in FIG. 1—or performed by a separate module or device, for example.

The second device node BCN_D_2 performs the second control instructions. If performance is successful, the second device node BCN_D_2 stores a second confirmation transaction in a block of the blockchain in act S4.

A device node is intended to be understood here to mean in particular a node of the blockchain that is simultaneously a device or has device properties in order to perform control instructions.

The disclosure allows complex control instruction chains (also called instruction sequences) to be performed in an (automation) network, in which nodes and/or device nodes and/or blockchain-external devices are networked to one another, in a simple manner even if different operators of the individual nodes and devices do not trust one another.

A further exemplary embodiment, not depicted in a figure, relates to a device as explained in FIG. 1 or FIG. 2 with the associated exemplary embodiments.

The device includes a first communication module, an optional first checking module, an optional first execution module and a second memory module, which are communicatively connected to one another via a bus. A bus in this instance may also be a simple program flow or a data interchange between the applicable components.

The device may additionally also include a further or multiple further component/s, such as for example a processor, a memory unit, further communication interfaces (e.g. Ethernet, WLAN), an input device, in particular a computer keyboard or a computer mouse, and a display device (e.g. a monitor). The processor may include multiple further processors that may be used in particular for realizing further exemplary embodiments. The further component/s may likewise be communicatively connected to one another via the bus.

The processor may be an ASIC, for example, that was realized on an application-specific basis for the functions of a respective module or of all modules of the exemplary embodiment (and/or of further exemplary embodiments), the program component or the program instructions being realized as integrated circuits, in particular. The processor may also be an FPGA, for example, that, in particular, is configured by the program instructions such that the FPGA performs the functions of a respective module or of all modules of the exemplary embodiment (and/or of further exemplary embodiments).

The first communication module, (e.g., an Ethernet interface), is configured to receive data blocks of a distributed database system (for example, a blockchain), wherein control transactions with control instructions for the device are stored in the data blocks of the distributed database system. The control transactions include execution requirements. The execution requirements include device-specific requirements for the device and/or presupposed control instruction. The applicable execution requirements are assigned to the respective control transactions.

The first checking module is configured to check the respective execution requirements for an execution of the control instructions of one of the control transactions by the device, wherein the device-specific requirements of the respective execution requirements of the respective control transaction for the device are checked and/or checking is performed to ascertain whether confirmation transactions for the presupposed control instructions of the respective execution requirements of the respective control transaction are available in data blocks of the distributed database system.

The first execution module is configured to execute the control instructions by the applicable device based on a result of the checking.

The second memory module is configured to store the result of the execution of the control instructions in confirmation transactions of the data blocks of the distributed database system.

The modules may be realized as a hardware component or as a software component or as a combination of hardware and software components, for example. By way of example, software components such as program libraries may be used in order to use program instructions of the program libraries to configure the processor such that it realizes the functionalities of an applicable module.

The device itself may be a node of a blockchain or of a distributed database system.

If the device has the first checking module and/or the first execution module, for example, this is advantageous for relocating all or some more computation-intensive checking tasks by the control system (FIG. 1-FIG. 2) or the distributed database system to the device or multiple devices of the same type as the device.

Figure 3:
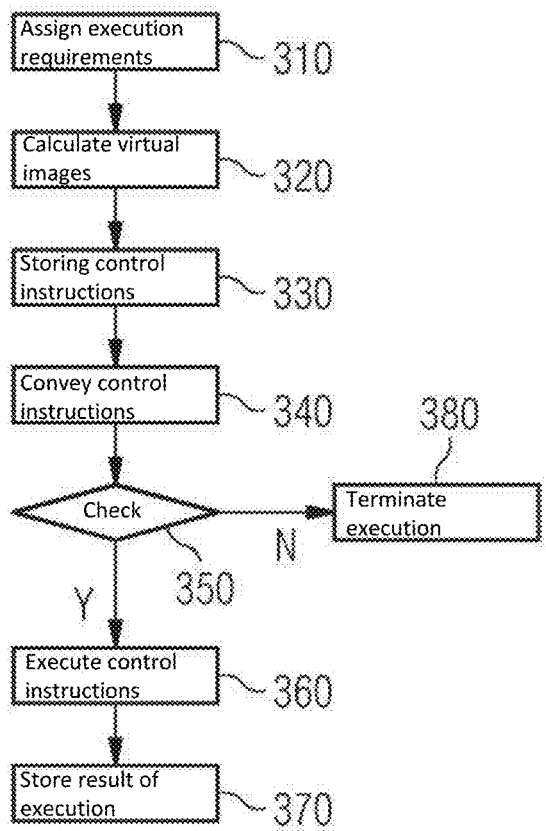
FIG. 3 depicts a further exemplary embodiment.

FIG. 3 depicts a third exemplary embodiment of by a flowchart of the method.

The method may be performed in computer-aided fashion.

The exemplary embodiment of a method for the computer-aided control of devices may, in one variant, include assigning execution requirements to the control instructions, wherein an executability of the control instructions by nodes of a distributed database system or by devices is ascertained based on the execution requirements, and wherein the execution requirements include device-specific requirements and/or presupposed control instructions. The method may further include calculating virtual images for the applicable nodes or the applicable devices, wherein the executability of the control instructions is ascertained by the virtual images. The method may further include storing the respective control instructions with the applicable execution requirements in control transactions, wherein the control transactions are stored in data blocks of a distributed database system. The method may further include conveying the control transactions to the devices by the data blocks. The method may further include checking the respective execution requirements for the execution of the control instructions of one of the control transactions by an applicable device, wherein the device-specific requirements for the applicable device are checked and/or checking is performed to ascertain whether confirmation transactions for the presupposed control instructions are available in data blocks of the distributed database system. The method may further include executing the control instructions by the applicable device based on a result of the checking. The method may further include storing the result of the execution of the control instructions in confirmation transactions of the data blocks of the distributed database system.

Specifically, a method for the computer-aided control of devices is performed in this exemplary embodiment.

The method includes a first method act 310 for assigning execution requirements to the control instructions, wherein an executability of the control instructions by nodes of a distributed database system or by devices is ascertained based on the execution requirements, and wherein the execution requirements include device-specific requirements and/or presupposed control instructions.

The method includes a second method act 320 for calculating virtual images (e.g. by Siemens Mindsphere) for the applicable nodes or the applicable devices, wherein the executability of the control instructions is ascertained by the virtual images.

The first and/or the second method act may moreover additionally include determining execution requirements for an execution of the control instructions by the devices, wherein applicable device-specific requirements and/or presupposed control instructions are stored in the execution requirements. The applicable method act may moreover also include further features, which were disclosed in association with the determining module from the preceding exemplary embodiments, for example.

The method includes a third method act for storing 330 the respective control instructions with the applicable execution requirements in control transactions, wherein the control transactions are stored in data blocks of a distributed database system.

Method acts four to eight (340-380) may be optional method acts, depending on the implementation variant.

The method includes a fourth method act for conveying 340 the control transactions to the devices by the data blocks. The conveying is effected for example via the first communication network by the distributed database system, as was explained in the preceding exemplary embodiments.

The method includes a fifth method act for checking 350 the respective execution requirements for the execution of one of the control instructions or of a control instruction or the control instructions of a control transaction by an applicable device, wherein the device-specific requirements of the control instructions for the applicable device are checked and/or checking is performed to ascertain whether confirmation transactions for the presupposed control instructions of the control instructions are available in data blocks of the distributed database system.

The checking yields a result that indicates whether the applicable device may Y or cannot N execute the control instructions.

Accordingly, the method includes a sixth method act for executing 360 the control instructions by the applicable device based on a result of the checking, wherein the control instructions of the control transaction are executed if this is permitted or confirmed Y by the (check) result.

The method includes a seventh method act for storing 370 the result of the execution of the control instructions in confirmation transactions of the data blocks of the distributed database system.

If the checking reveals or the result indicates that the control instructions cannot N be executed by the applicable device, an eighth method act 380 is carried out. This method act may terminate the execution of the control instructions of the instruction sequence, for example by virtue of a terminate control instruction for the control instructions of the instruction sequence being stored in a transaction, which is in turn stored in blocks of the blockchain. Alternatively or additionally, all or some of these or further control instructions that have resulted from the instruction sequence may be terminated or annulled. Alternatively or additionally, an execution/performance of the applicable control instructions is prevented.

Alternatively or additionally, the check may be restarted in the eighth method act, and the method returns to method act five. In this manner, it is possible, by way of example, to implement a wait until the execution requirements are met, for example. This may involve a configurable time delay being taken into consideration, for example, which indicates in particular how long it takes before there is a return to the fifth method act.

Alternatively or additionally, the result may also be stored in a confirmation transaction in the blockchain (e.g., in a block of the blockchain) in the eighth method act.

The individual method acts may—as was explained in the preceding exemplary embodiments—be performed by different components of the control system. These are for example the distributed database system itself and/or the devices and/or nodes of the distributed database system.

The disclosure (from this exemplary embodiment or the preceding exemplary embodiments) may easily be used to break down an instruction sequence into control instructions or control transactions that are then performed by appropriately suitable devices. This is provided by the high level of data integrity that is achieved by a blockchain, for example (e.g. in order to achieve protection against manipulation for the control instructions to be performed in the control transactions). Because the result of the performance of the control instructions or control transactions is stored in confirmation transactions, the devices may also be monitored. The confirmation transactions may also include details of the performance of the control transactions/control instructions. These are e.g. production time or production problems that have arisen during performance (e.g. production of a product). In this respect, a confirmation transaction may also include information indicating that the performance of the control instructions was not successful. If these control instructions that have not been executed successfully are presupposed control instructions for other/further control instructions, then in particular the result of the checking of the execution requirements of these other/further control instructions would reveal that these other/further control instructions cannot be executed by a/the applicable device.

If the execution requirements for the other/further control instructions are met, however, then they are executed by an applicable device.

FIG. 4 depicts a fourth exemplary embodiment as a determining module 110.

The determining module 110 is suitable for a distributed database system or for a control system having a distributed database system for controlling and/or monitoring devices or for devices that execute control instructions (e.g. in the form of transactions).

The determining module 110 includes a first interface 410, a first evaluation unit 420 and optionally a configuration memory 430, which may be communicatively connected to one another via a bus 401. A bus may also be a simple program flow or a data interchange between the applicable components.

The determining module may additionally also include a further or multiple further component/s, such as for example a processor, a memory unit, further communication interfaces (e.g. Ethernet, WLAN), an input device, in particular a computer keyboard or a computer mouse, and a display device (e.g. a monitor). The processor may include multiple further processors, for example, that may be used to realize further exemplary embodiments, in particular. The further component/s may likewise be communicatively connected to one another via the bus, for example.

The processor may be an ASIC, for example, that was realized on an application-specific basis for the functions of a respective module (or of a unit) or of all modules of the exemplary embodiment (and/or of further exemplary embodiments), the program component or the program instructions being realized as integrated circuits, in particular. The processor may also be an FPGA, for example, that, in particular, is configured by the program instructions such that the FPGA performs the functions of a respective module or of all modules of the exemplary embodiment (and/or of further exemplary embodiments).

The first interface 410 is configured to receive or retrieve control instructions. The control instructions may be conveyed to the first interface 410 by a user by a GUI. The control instructions may alternatively be provided by a server or another database. This may again be a distributed database system or a hierarchic database, for example. Should the determining module be used in a control system, for example, then the control instructions or an instruction sequence may be conveyed to the control system in the same way as described in this exemplary embodiment.

The control instructions may also be provided by a breakdown module, as was explained in the preceding exemplary embodiments. The breakdown module receives or retrieves the control instructions or instruction sequences for this purpose.

The control instructions or instruction sequences may be conveyed to the first breakdown module by a user by a GUI and, by way of example, via a second interface or the first interface 410. The control instructions or the instruction sequences may alternatively be provided to the breakdown module by a server or another database. This may again be a distributed database system or a hierarchic database, for example.

The first evaluation unit 420 is configured for assignment, wherein the first evaluation unit (420) assigns execution requirements to the control instructions. An executability of the control instructions by nodes of a distributed database system or by devices is ascertained based on the execution requirements. The execution requirements include device-specific requirements and/or presupposed control instructions. The first determining module includes a virtualization module, wherein the virtualization module includes virtual images of the applicable nodes or of the applicable devices. The executability of the control instructions is ascertained by the virtual images.

The configuration memory includes the device-specific data about the devices and/or device-specific data about the nodes and/or the device-specific requirements.

The determining module is advantageous for, in particular, improving the execution of control instructions by devices or nodes (e.g. production robots, control systems for a power distribution network, bank terminals, automated teller machines, transfers between banks) that are connected to one another via a network.

The determining module may also assign the control instructions to specific devices that are supposed to execute them, for example. This may be stored in the execution requirements.

Additionally, security during the operation of a distributed infrastructure (e.g. a distributed database system having devices and/or nodes or nodes/devices that access the distributed database system) implemented wholly or in part by a distributed database system (e.g. a blockchain) may be increased, for example.

In particular, the term control instructions may be understood broadly. In addition to the definition cited above, for example, it may also mean transactions that are supposed to be executed by a device (e.g. a node of a blockchain or a device outside the blockchain, e.g. device D). In other words, the apparatus converts in particular unchecked transactions into checked transactions, the check being performed based on the device-specific requirements and device-specific data that are supposed to execute the control instructions, for example.

The disclosure may be used to provide or check demanded device-specific requirements for the execution of the control instructions on the device, for example. The device-specific requirements may also be security requirements and/or location-related requirements (e.g. a country statement, a GPS statement or zip code (PLZ)) that a device is supposed to meet for executing the control instructions. As an alternative, specific/prescribed authentication may also be called for by the device-specific requirements for the execution, for example.

The device-specific requirements for nodes or devices may also be user-related or include user-specific requirements, for example. By way of example, a first user may call for low precision for producing a workpiece in his assigned device-specific requirements. By way of example, a second user may then call for higher precision for producing a workpiece in his assigned device-specific requirements. In this way, it is e.g. also possible for security requirements to be stored in user-related fashion. It is, by way of example, also conceivable for specific types or kinds of control instructions—user-related or otherwise—to have assigned device-specific requirements that are taken into consideration by the determining module. By way of example, one requirement may be that a control instruction for loading firmware is performed only by a device that meets prescribed security requirements, e.g. in order to provide that expertise in the firmware is not readily accessible to anyone in a production installation. These prescribed security requirements may call for only specific personnel to have access to an applicable device or for the device to be protected by a password and/or other cryptographic mechanisms (e.g. access is possible only by inserting a chip card and entering a pin).

This may be the case for example if someone wishes to use a device (e.g. an automated teller machine) to withdraw cash. The control instructions are then, by way of example, the request by the customer to make a cash payment. If, for example, an applicable customer has specified (e.g. at his home bank or using online banking) that the customer preferably permits a cash payment only in prescribed countries, (e.g. Italy, France and Austria), then this is stored in the device-specific requirements, which may be assigned to a specific user. An automated teller machine in Andorra might then not permit a payment or prevent a payment. It is also possible, by way of example, for the security requirements to call for prescribed authentication of the customer. By way of example, for a pin to be entered for a payment (which is not necessarily the case e.g. in the USA) and/or for a specific pin length to be required (e.g. 8 characters) and/or for other additional authentication methods to be required (e.g. 2-factor authentication, mobile TAN, Google Authenticator). By way of example, loading of a cash card may be implemented in similar fashion, with e.g. the device-specific requirements for the cash card and the loading device prescribing security requirements. By way of example, the cash card or the loading device need to use or have prescribed cryptographic methods and/or authentication methods in order to perform the loading process.

Alternatively or additionally, the (first) evaluation unit may also analyze the control instructions further or analyze them more comprehensively. If for example the evaluation unit already discovers that the device-specific requirements are not met or are not meetable (e.g. the control instructions were sent from an unapproved country or are intended for execution in an unapproved country), it is e.g. possible for the (first) evaluation unit to create a control transaction that indicates the non-executability to the applicable device, node or the system and may prevent or prohibit an execution of the control instructions. Alternatively, it is, by way of example, also possible for no control transaction to be produced, and at some point, there is a timeout for the execution of the control instructions, e.g. after a prescribed period.

To discover this, the (first) evaluation unit compares the device-specific data for the device that is supposed to execute the control instructions with the device-specific requirements e.g. for the control instructions. Depending on the result of this comparison, either a control transaction permitting an execution of the control instructions on the applicable device is then produced, or a control transaction is not created or a control transaction prohibiting or preventing an execution of the control instructions is created.

If the (first) evaluation unit discovers that the control instructions are executable (e.g., the comparison is positive), the (first) evaluation unit produces applicable execution requirements and conveys the control instructions and the execution requirements to the first assigning module, for example, to assign the respective execution requirements to the control instructions. The first assigning module may be an integral component of the determining module or an integral component of the evaluation unit.

After that, the control instructions, if need be together with the associated execution requirements, are conveyed to a first memory module of the determining module, for example. This conveyance may be effected by the assigning module, the (first) evaluation unit or the determining module itself, for example.

The first memory module is configured to store the respective control instructions in control transactions, wherein the control instructions are, by way of example, stored together with the assigned execution requirements in the control transactions, for example if the control instructions are executable by one of the devices (e.g. an automated teller machine).

In other words, the result of the comparison is taken as a basis for stipulating whether a control transaction is stored and/or with what content a control transaction is stored.

For storage, the control transactions may then be stored in data blocks (B) of the distributed database system (BC), wherein in particular the control transactions are transmitted to the devices (D, BCN_D) or the nodes by the data blocks (B)—provided that a control transaction has been created.

Additionally, the determining module 110 may also include a first assigning module and/or a first memory module and/or further modules, for example, as was explained in the exemplary embodiments. The nodes or devices may then include a checking module and/or an execution module, for example, as was explained in the exemplary embodiments.

It would, by way of example, also be conceivable for online banking to be protected in the manner mentioned above by virtue of security requirements and/or location-related requirements of the computer (e.g., the device sending control instructions) being checked in order to discover whether the payment or transfer is permitted by another device. To this end, this computer may be a node of the distributed database system or a device, for example—as was already explained.

In particular determining the dependencies of the control instructions or instruction sequence during the execution thereof by the devices or nodes may be difficult in a complex control system having a very large number of nodes or devices (e.g. 200-1000 devices/nodes). The virtualization module may be used to improve in particular the determination of the executability and the dependencies of control instructions on one another, because e.g. the performance of the control instructions and/or the allowance for the execution requirements (e.g. the device-specific requirements) and/or the dependencies between control instructions may be simulated or checked by the virtual images. This also allows in particular an optimization of the control instructions to be improved and also allows an accuracy of a statement about whether the control instructions are executable to be improved, for example.

For this purpose the determining module may first ascertain the relevant devices and/or nodes for the execution of the control instructions and may instantiate the devices and/or nodes in or by the virtualization module as virtual images of the applicable nodes or the applicable devices. The instantiated virtual images (e.g., the images for the applicable nodes and/or the applicable devices) then have the control instructions conveyed to them for (virtual) execution.

The virtual images perform the control instructions, and the virtualization module captures execution parameters in the process. These are e.g. execution time, energy consumption and material consumption, or a simulated variable for these parameters.

Based on these execution parameters, the determining module may then e.g. establish whether or not the execution requirements are met. Alternatively or additionally, the applicable execution requirements may also be determined in this manner. Alternatively or additionally, these execution parameters may also be used to optimize the control instructions and/or execution requirements.

It is thus possible for the virtualization module to ascertain for example the executability for prescribed control instructions by the applicable prescribed devices or nodes.

In a further variant, the optimizer may optimize the control instructions by the virtual images and the captured execution parameters.

In a further variant, the virtual images are used to ascertain an analysis of the effect of the execution of the control instructions on the devices and the distributed database system with the nodes.

The virtual images may be realized for example as digital twins of the devices or nodes and/or as a two-dimensional and/or three-dimensional virtual image.

Alternatively or additionally, the virtual images may simulate mechanical or electrical properties of the devices and/or the nodes.

Alternatively or additionally, the virtual images may be used to perform a reliability analysis for a successful execution of the control instructions. This may be accomplished by performing for example an FMEA (Failure Mode and Effects Analysis, or "effects analysis" for short) and FMECA (Failure Mode and Effects and Criticality Analysis) for an execution of the control instructions by the devices/nodes.

If the result of the check may be that the control instructions may be executed only inadequately (e.g. the result of the FMEA is a successful execution of the control instructions with a probability of 40%) and/or specific stipulations of the execution requirements (e.g. a successful probability of at least 90% is demanded for an execution of the control instructions) are not met, a control transaction permitting an execution of the control instructions is not created for the applicable control instructions. Alternatively or additionally, if the execution requirements are not met, a control transaction that explicitly prevents an execution of the control instructions may be created and stored.

FIG. 5 depicts a fifth exemplary embodiment as a flowchart for a method.

The method may be performed in computer-aided fashion.

Specifically, a method for the computer-aided determination or assignment of execution requirements for control instructions is performed in this exemplary embodiment. The method may also be used to ascertain the executability of control instructions, for example, as explained in FIG. 4, for example.

The method includes a first method act 510 for receiving or retrieving control instructions.

The method includes a second method act 520 for assigning execution requirements to the control instructions, wherein an executability of the control instructions by nodes of a distributed database system or by devices is ascertained based on the execution requirements. The execution requirements include device-specific requirements and/or presupposed control instructions. The distributed database system is a blockchain, for example.

The method includes a third method act 530 for calculating virtual images for the applicable nodes or the applicable devices, wherein the executability of the control instructions is ascertained by the virtual images.

The assigning or the calculating may involve checking an executability of the control instructions by nodes of a distributed database system or by devices based on device-specific requirements and/or presupposed control instructions by the virtual images. This check additionally involves for example the device-specific data and/or the already executed control instructions or control transactions being checked as well. By way of example, checking is performed to ascertain whether a device meets the device-specific requirements by virtue of the device-specific data being checked for the applicable device.

The method may include a method act for determining execution requirements based on the result of the checking of the executability for an execution of control instructions by nodes of a distributed database system or by devices.

In other words, e.g. the execution requirements may be determined based on device-specific requirements and/or presupposed control instructions.

These method acts (assigning and/or determining the execution requirements) may be implemented by the (first) evaluation unit of the determining module from FIG. 4, for example.

The device-specific requirements and/or the presupposed control instructions are stored in the execution requirements. The distributed database system is a blockchain, for example.

The nodes or devices are e.g. connected by the distributed database system.

To determine the execution requirements, e.g. the device-specific requirements or presupposed control instructions are analyzed and compared with the already executed control instructions and device-specific requirements for available devices. By way of example, this act may also involve a specific node or a specific device that is supposed to execute the control instructions being specifically allocated or assigned. This in particular improves the reliability and security of the execution or provides that the execution e.g. produces the desired result. This is e.g. that a product was produced with the required precision.

In particular determining the dependencies of the control instructions or instruction sequence during the execution thereof by the devices or nodes may be difficult in a complex control system having a very large number of nodes or devices (e.g. 200-1000 devices/nodes). The virtualization module may be used to improve in particular the determination of the executability and the dependencies of control instructions on one another, because e.g. the performance of the control instructions and/or the allowance for the execution requirements (e.g. the device-specific requirements) and/or the dependencies between control instructions may be simulated or checked by the virtual images. This also allows in particular an optimization of the control instructions to be improved and also allows an accuracy of a statement about whether the control instructions are executable to be improved, for example.

For this purpose the determining module may first ascertain the relevant devices and/or nodes for the execution of the control instructions and may instantiate the devices and/or nodes in or by the virtualization module as virtual images of the applicable nodes or the applicable devices. Instantiated virtual images (for the applicable nodes and/or the applicable devices) then have the control instructions conveyed to them for (virtual) execution.

The virtual images perform the control instructions, and the virtualization module captures execution parameters in the process. These are e.g. execution time, energy consumption and material consumption, or a simulated variable for these parameters.

Based on these execution parameters, the determining module may then e.g. establish whether or not the execution requirements are met. Alternatively or additionally, the applicable execution requirements may also be determined in this manner. Alternatively or additionally, these execution parameters may also be used to optimize the control instructions and/or execution requirements.

It is thus possible for the virtualization module to ascertain for example the executability for prescribed control instructions by the applicable prescribed devices or nodes.

In a further variant, the optimizer may optimize the control instructions by the virtual images and the captured execution parameters.

In a further variant, the virtual images are used to ascertain an analysis of the effect of the execution of the control instructions on the devices and the distributed database system with the nodes.

The virtual images may be realized for example as digital twins of the devices or the nodes and/or as a two-dimensional and/or three-dimensional virtual image.

Alternatively or additionally, the virtual images may simulate mechanical or electrical properties of the devices and/or the nodes.

Alternatively or additionally, the virtual images may be used to perform a reliability analysis for a successful execution of the control instructions. This may be accomplished by performing for example an FMEA (Failure Mode and Effects Analysis, or "effects analysis" for short) and FMECA (Failure Mode and Effects and Criticality Analysis) for an execution of the control instructions by the devices/nodes.

If the result of the check may be that the control instructions may be executed only inadequately (e.g. the result of the FMEA is a successful execution of the control instructions with a probability of 40%) and/or specific stipulations of the execution requirements (e.g. a successful probability of at least 90% is demanded for an execution of the control instructions) are not met, a control transaction permitting an execution of the control instructions is not created for the applicable control instructions. Alternatively or additionally, if the execution requirements are not met, a control transaction that explicitly prevents an execution of the control instructions may be created and stored.

A few further exemplary embodiments are explained below. These exemplary embodiments are likewise compatible with the variants of the exemplary embodiments explained previously.

A further exemplary embodiment (not depicted in a figure) relates to a control system for controlling and/or monitoring devices. The control system includes a distributed database system having a multiplicity of nodes, wherein the nodes and the devices are connected to one another via a first communication network. The system may further include a first determining module, wherein the first determining module may be configured to assign execution requirements to control instructions. An executability of the control instructions by nodes of the distributed database system or by devices may be ascertained based on the execution requirements. The execution requirements may include device-specific requirements and/or presupposed control instructions. The first determining module may include a virtualization module, wherein the virtualization module may include virtual images of the applicable nodes or of the applicable devices. The executability of the control instructions may be ascertained by the virtual images.

The system may further include a first memory module for storing the respective control instructions with the assigned execution requirements in control transactions, wherein the control transactions may be stored in data blocks of the distributed database system or for example the control transactions are stored by the distributed database system. The control transactions may be transmitted to the devices by the data blocks or for example the control transactions are transmitted to the devices by the distributed database system.

A further exemplary embodiment (not depicted in a figure) relates to a determining module for a distributed database system or for a control system having a distributed database system for controlling and/or monitoring devices. The determining module may include a first interface for receiving or retrieving control instructions. The determining module may further include a first evaluation unit, wherein the first evaluation unit may be configured to assign execution requirements to the control instructions. An executability of the control instructions by nodes of a distributed database system or by devices may be ascertained based on the execution requirements. The execution requirements may include device-specific requirements and/or presupposed control instructions. The first determining module may include a virtualization module, wherein the virtualization module may include virtual images of the applicable nodes or of the applicable devices. The executability of the control instructions may be ascertained by the virtual images.

A further exemplary embodiment (not depicted in a figure) relates to an apparatus for a distributed database system or for a control system having a distributed database system for controlling and/or monitoring devices. The apparatus may include a first determining module, wherein the distributed database system may include a multiplicity of nodes, the nodes and the devices being connected to one another via a first communication network. The first determining module may be configured to assign execution requirements to control instructions. An executability of the control instructions by nodes of the distributed database system or by devices may be ascertained based on the execution requirements. The execution requirements may include device-specific requirements and/or presupposed control instructions. The first determining module may include a virtualization module, wherein the virtualization module may include virtual images of the applicable nodes or of the applicable devices. The executability of the control instructions may be ascertained by the virtual images.

A further exemplary embodiment (not depicted in a figure) relates to a method for the computer-aided assignment of execution requirements for control instructions, The method may include receiving or retrieving control instructions. The method may further include assigning execution requirements to the control instructions, wherein an executability of the control instructions by nodes of a distributed database system or by devices may be ascertained based on the execution requirements, wherein the execution requirements may include device-specific requirements and/or presupposed control instructions, and wherein the distributed database system may be a blockchain. The method may further include calculating virtual images for the applicable nodes or the applicable devices, wherein the executability of the control instructions may be ascertained by the virtual images.

A further exemplary embodiment (not depicted in a figure) relates to a method for the computer-aided control of devices. The method may include assigning execution requirements to the control instructions, wherein an executability of the control instructions by nodes of a distributed database system or by devices may be ascertained based on the execution requirements, and wherein the execution requirements may include device-specific requirements and/or presupposed control instructions. The method may further include calculating virtual images for the applicable nodes or the applicable devices, wherein the executability of the control instructions may be ascertained by the virtual images. The method may further include storing (530) the respective control instructions with the applicable execution requirements in control transactions, wherein for example the control transactions are stored in data blocks of a distributed database system or for example the control transactions are stored by a distributed database system.

Although the disclosure has been illustrated and described more specifically in detail by the exemplary embodiments, the disclosure is not limited by the disclosed examples, and other variations may be derived therefrom by a person skilled in the art without departing from the scope of protection of the disclosure.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification

The invention claimed is:

1. A control system for controlling and/or monitoring devices, the control system comprising:
  a distributed database system having a multiplicity of nodes connected to the devices via a first communication network, wherein the control system is configured to assign execution requirements to control instructions, wherein an executability of the control instructions by the multiplicity of nodes of the distributed database system or by the devices is ascertained based on the execution requirements, wherein the execution requirements comprise device-specific requirements and/or presupposed control instructions, wherein the control system comprises virtual images of applicable nodes of the multiplicity of nodes or of applicable devices of the devices, and wherein the executability of the control instructions is configured to be ascertained by the virtual images; and
  a first memory module for storing the respective control instructions with the assigned execution requirements in control transactions, wherein the control transactions are configured to be stored in data blocks of the distributed database system or the control transactions are configured to be stored by the distributed database system,
  wherein the control transactions are configured to be transmitted to the devices by the data blocks or the control transactions are transmitted to the devices by the distributed database system.

2. The control system of claim 1, wherein the presupposed control instructions are already executed control instructions for which a confirmation of the execution thereof is stored in confirmation transactions of the data blocks of the distributed database system or for which a confirmation of the execution thereof is stored in confirmation transactions of the distributed database system.

3. The control system of claim 1, wherein the execution requirements prescribe a performance of the presupposed control instructions before further control instructions are performed.

4. The control system of claim 1, wherein the execution requirements prescribe an order of a performance of the control instructions.

5. The control system of claim 1, wherein the execution requirements prescribe dependencies with respect to other control instructions for a performance of the control instructions.

6. The control system of claim 1, wherein the execution requirements prescribe priorities for a performance of the control instructions.

7. The control system of claim 1, wherein the execution requirements prescribe a time limit by which control instructions need to be performed.

8. The control system of claim 1, wherein the control system is further configured to optimize an execution of the control instructions by the devices based on a prescribed criterion.

9. The control system of claim 1, wherein the distributed database system is a blockchain and data blocks are blocks of the blockchain, or
wherein the distributed database system is a peer-to-peer database system.

10. A method for a computer-aided assignment of execution requirements for control instructions, the method comprising:
receiving or retrieving control instructions;
assigning execution requirements to the control instructions, wherein an executability of the control instructions by nodes of a distributed database system or by devices is ascertained based on the execution requirements, and wherein the execution requirements comprise device-specific requirements and/or presupposed control instructions;
calculating virtual images for applicable nodes of the nodes or applicable devices of the devices, wherein the executability of the control instructions is ascertained by the virtual images; and
storing the respective control instructions with applicable execution requirements in control transactions,
wherein the control transactions are stored in data blocks of a distributed database system or the control transactions are stored by a distributed database system.

11. The method of claim 10, wherein the distributed database system is a blockchain.

* * * * *